US012715425B2

(12) United States Patent
Beinborn et al.

(10) Patent No.: US 12,715,425 B2
(45) Date of Patent: Aug. 25, 2026

(54) METHODS AND SYSTEMS FOR MANAGING AND CONTROLLING EMISSIONS IN A HYBRID SYSTEM

(71) Applicants: CUMMINS INC., Columbus, OH (US); HYDROGENICS CORPORATION, Mississauga (CA)

(72) Inventors: Aaron William Beinborn, Columbus, IN (US); David P. Genter, Columbus, IN (US); Nathaniel Ian Joos, Toronto (CA); Archit Koti, Sunnyvale, CA (US); Guangji Ji, Wuhan (CN)

(73) Assignees: CUMMINS INC., Columbus, OH (US); HYDROGENICS CORPORATION, Mississauga (CA)

( * ) Notice: Subject to any disclaimer, the term of this patent is extended or adjusted under 35 U.S.C. 154(b) by 39 days.

(21) Appl. No.: 18/786,186

(22) Filed: Jul. 26, 2024

(65) Prior Publication Data

US 2024/0383467 A1 Nov. 21, 2024

Related U.S. Application Data

(63) Continuation of application No. 17/592,222, filed on Feb. 3, 2022, now Pat. No. 12,065,128.

(60) Provisional application No. 63/166,075, filed on Mar. 25, 2021.

(51) Int. Cl.

*B60W 20/16* (2016.01)
*B60W 10/26* (2006.01)
*B60W 10/28* (2006.01)

(52) U.S. Cl.

CPC ............ *B60W 20/16* (2016.01); *B60W 10/26* (2013.01); *B60W 10/28* (2013.01); *B60W 2555/00* (2020.02); *B60W 2710/242* (2013.01); *B60W 2710/28* (2013.01)

(58) Field of Classification Search

CPC ...... B60W 20/16; B60W 10/26; B60W 10/28; B60W 2555/00; B60W 2710/242; B60W 2710/28; B60W 10/06; B60W 30/1882; B60W 2555/60; B60W 2556/50; B60W 10/08; Y02T 90/40; B60L 3/0023; B60L 15/20; B60L 50/16; B60L 2200/10; B60L 2200/18; B60L 2200/26; B60L 2200/32; B60L 2200/40; B60L 2240/622; B60L 2270/12; B60L 58/40; B60L 50/75;

(Continued)

(56) References Cited

U.S. PATENT DOCUMENTS

| | | | |
|---|---|---|---|
| 6,483,198 | B2 | 11/2002 | Schmitz et al. |
| 8,005,587 | B2 | 8/2011 | Tamor et al. |
| 8,362,887 | B2 | 1/2013 | Morgan et al. |

(Continued)

FOREIGN PATENT DOCUMENTS

| | | | |
|---|---|---|---|
| DE | 102012015961 | A1 | 2/2014 |
| EP | 2689982 | A1 | 1/2014 |
| WO | 2017/027332 | A1 | 2/2017 |

*Primary Examiner* — Yi-Kai Wang

(74) *Attorney, Agent, or Firm* — Barnes & Thornburg LLP

(57) ABSTRACT

The present disclosure generally relates to a system and methods for managing and controlling emissions produced by a vehicle and/or powertrain, which includes one or more power sources selected from a fuel cell, a fuel cell stack, a battery, and combinations thereof, a processor, one or more inputs, a controller, and one or more emission control devices.

20 Claims, 2 Drawing Sheets

(58) Field of Classification Search

CPC ... B63B 79/10; B63B 83/40; F02D 2200/701; G06Q 50/26; F01N 9/00; H01M 8/24

USPC .......................................................... 701/22

See application file for complete search history.

(56) References Cited

U.S. PATENT DOCUMENTS

| | | | | | |
|---|---|---|---|---|---|
| 8,659,404 | B2 | 2/2014 | Morgan et al. | | |
| 8,825,369 | B2 | 9/2014 | Jin | | |
| 9,108,503 | B2 | 8/2015 | Wang et al. | | |
| 9,248,825 | B2 | 2/2016 | King et al. | | |
| 9,469,289 | B2 | 10/2016 | Yu | | |
| 9,646,351 | B2 | 5/2017 | Harter et al. | | |
| 2005/0251299 | A1* | 11/2005 | Donnelly | B60L 15/20 | 701/19 |
| 2006/0040144 | A1 | 2/2006 | Shimizu et al. | | |
| 2013/0245864 | A1* | 9/2013 | Frazier | B61C 17/12 | 701/19 |
| 2015/0274156 | A1 | 10/2015 | Phillips et al. | | |
| 2022/0297072 | A1 | 9/2022 | Nunokawa | | |

* cited by examiner

METHODS AND SYSTEMS FOR MANAGING AND CONTROLLING EMISSIONS IN A HYBRID SYSTEM

CROSS-REFERENCE TO RELATED APPLICATIONS

This nonprovisional application is a continuation of U.S. patent application Ser. No. 17/592,222, filed on Feb. 3, 2022, which claims the benefit and priority, under 35 U.S.C. § 119(e) and any other applicable laws or statutes, to U.S. Provisional Patent Application Ser. No. 63/166,075 filed on Mar. 25, 2021, the entire disclosures of each of which are hereby expressly incorporated herein by reference.

TECHNICAL FIELD

The present disclosure relates to a method and system for determining, applying, managing, and/or controlling an emission criteria strategy that satisfies the power requirements of a vehicle and/or powertrain.

BACKGROUND

Vehicles and/or powertrains function in places with varying geographical, morphological, and regulatory conditions. In various locations, governmental or other regulatory bodies may impose restrictions on the level, concentration, and/or amount of emissions or emittants that are legally allowed and/or prohibited by any vehicle. In other instances, such regulatory bodies may provide publicly available and/or known standards of vehicle emissions, emittants, or exhaustion, such as a release of chemicals and/or compounds from the vehicle and/or powertrain that will be tolerated within its geographical areas.

For example, marine vessel vehicles may dock into several waterway ports (e.g., sea, ocean, or river ports) on one or more journeys and certainly over their lifetime. Most waterway ports, particularly sea and ocean ports, are emission controlled regions. Vehicle emission requirements of waterway ports may necessitate the use of certain power strategies to reduce emissions to a required level when the vehicles and/or powertrains are approaching, entering, docking, and/or exiting those waterway ports. In some illustrative operational conditions, a second power source different from a first power source used in the open sea may need to be utilized in order to achieve required vehicle emissions requirements.

For example, vehicle emissions standards and regulations typically require one or more vehicle power sources to meet a defined schedule of limits or requirements. Generally, vehicle emissions regulations limit or control an output, a shaft, a torque, and/or a speed requirement.

Manipulating these operation parameters may simulate and/or predict a broad range of operating conditions encountered in real world operations of a vehicle or powertrain under regulatory conditions.

Diesel engines also provide present unique challenges relative to emissions. For example, regulatory compliant use of diesel engines typically requires simultaneous limitation of emissions to the environment while also meeting performance requirements. Desired performance with compliant vehicle emissions may require manipulation of emissions, including but not limited to nitrous oxide (NOx), particulates, hydrocarbons, carbon monoxide, carbon dioxide, and hydrogen.

For example, in diesel engines, existing systems or components rely upon combinations of exhaust gas recirculation, variable geometry turbochargers, selective catalytic reduction, and diesel particulate filtration to balance the competing requirements of vehicle emissions regulations with consumer required performance. While successful, these engine features impose complexity, cost, and fuel economy penalties as a trade-off for satisfactory emissions control.

Some proposed diesel systems rely upon homogeneous combustion modes, such as homogeneous charge compression ignition, homogeneous charge late injection, and other homogeneous combustion modes to reduce emissions. While providing certain emissions benefits over non-homogeneous combustion diesel engines, homogeneous combustion diesel engines pose difficult control problems and impose significant cost and complexity to control vehicle emissions. For these and other reasons, the present specification provides a method and system for determining, applying, managing, and/or controlling an emission criteria strategy that satisfies the power requirements of a vehicle and/or powertrain.

SUMMARY

Embodiments of the present invention are included to meet these and other needs.

In one aspect, the present disclosure is directed to a method for managing hydrogen emissions produced by a vehicle. The method includes controlling a first power source and a second power source different from the first power source so that the first power source provides a majority of a total power required by the vehicle. The method includes receiving one or more inputs into a processor of the vehicle. The one or more inputs include a vehicle location of the vehicle and a geofencing restriction. The method includes generating an emission criteria management strategy by the processor based on the one or more inputs. The method includes determining a distance between the vehicle location of the vehicle and the geofencing restriction. The method includes, in response to the distance being equal to or less than a threshold, implementing the emission criteria management strategy by a controller that communicates with the first power source, the second power source, and one or more emission control devices. Implementing the emission criteria management strategy includes managing the hydrogen emissions from the one or more emission control devices.

In some embodiments, managing the hydrogen emissions from the one or more emission control devices may include moving a portion of the hydrogen emissions into an internal tank of the vehicle for storage before the vehicle enters the geofencing restriction. In some embodiments, managing the hydrogen emissions from the one or more emission control devices may include purging the hydrogen emissions from the vehicle before the vehicle enters the geofencing restriction to prevent hydrogen accumulation above 4% by volume. In some embodiments, managing the hydrogen emissions from the one or more emission control devices may include diluting the hydrogen emissions before the vehicle enters the geofencing restriction.

In some embodiments, the first power source may be an engine and the second power source may be a battery. In some embodiments, the first power source may be a fuel cell and the second power source may be a battery.

In some embodiments, the threshold may be greater than zero such that the emission criteria management strategy is implemented before the vehicle enters the geofencing restriction. In some embodiments, managing the hydrogen emissions from the one or more emission control devices may include controlling the first power source and the second power source via the controller such that the second power source provides the majority of the total power required by the vehicle so that a production of hydrogen exhaust by the first power source is decreased.

In some embodiments, the method may further comprise receiving sensor inputs into the processor from one or more sensors on the vehicle related to an amount of hydrogen emissions from the one or more emission control devices. In some embodiments, the method may further comprise charging the second power source in response to the distance being greater than the threshold.

In some embodiments, the vehicle may comprise a marine vessel, a train, a bus, or a mining equipment. In some embodiments, the vehicle may be used on waterways, highways, off-highways, off-road, underground, or in high altitude regions.

In another aspect, the present disclosure is directed to a system for managing hydrogen emissions produced by a vehicle. The system includes a first power source, a second power source, a processor, and a controller. The second power source is different from the first power source. The processor generates an emission criteria management strategy based, at least in part, on one or more inputs. The one or more inputs include a vehicle location of the vehicle and a geofencing restriction. The controller is configured to operate the first power source such that the first power source provides a majority of a total power required by the vehicle and is configured to implement the emission criteria management strategy by managing the hydrogen emissions from one or more emission control devices in response to determining that a distance between the vehicle location of the vehicle and the geofencing restriction is equal to or less than a threshold.

In some embodiments, the system may further include an internal tank. In some embodiments, a portion of the hydrogen emissions may be moved into the internal tank for storage before the vehicle enters the geofencing restriction. In some embodiments, the system may further include a ventilation system. In some embodiments, the hydrogen emissions may be purged from the vehicle through the ventilation system before the vehicle enters the geofencing restriction.

In some embodiments, the first power source may be an engine and the second power source may be a battery. In some embodiments, the first power source may be a fuel cell and the second power source may be a battery.

In some embodiments, the threshold may be greater than zero such that the emission criteria management strategy is implemented before the vehicle enters the geofencing restriction. In some embodiments, the controller may be configured to operate the first power source and the second power source such that the second power source provides the majority of the total power required by the vehicle in order to manage the hydrogen emissions from the one more emission control devices so that a production of hydrogen exhaust by the first power source is decreased. In some embodiments, the system may further comprise one or more sensors configured to provide sensor inputs to the processor related to an amount of hydrogen emissions from the one or more emission control devices.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
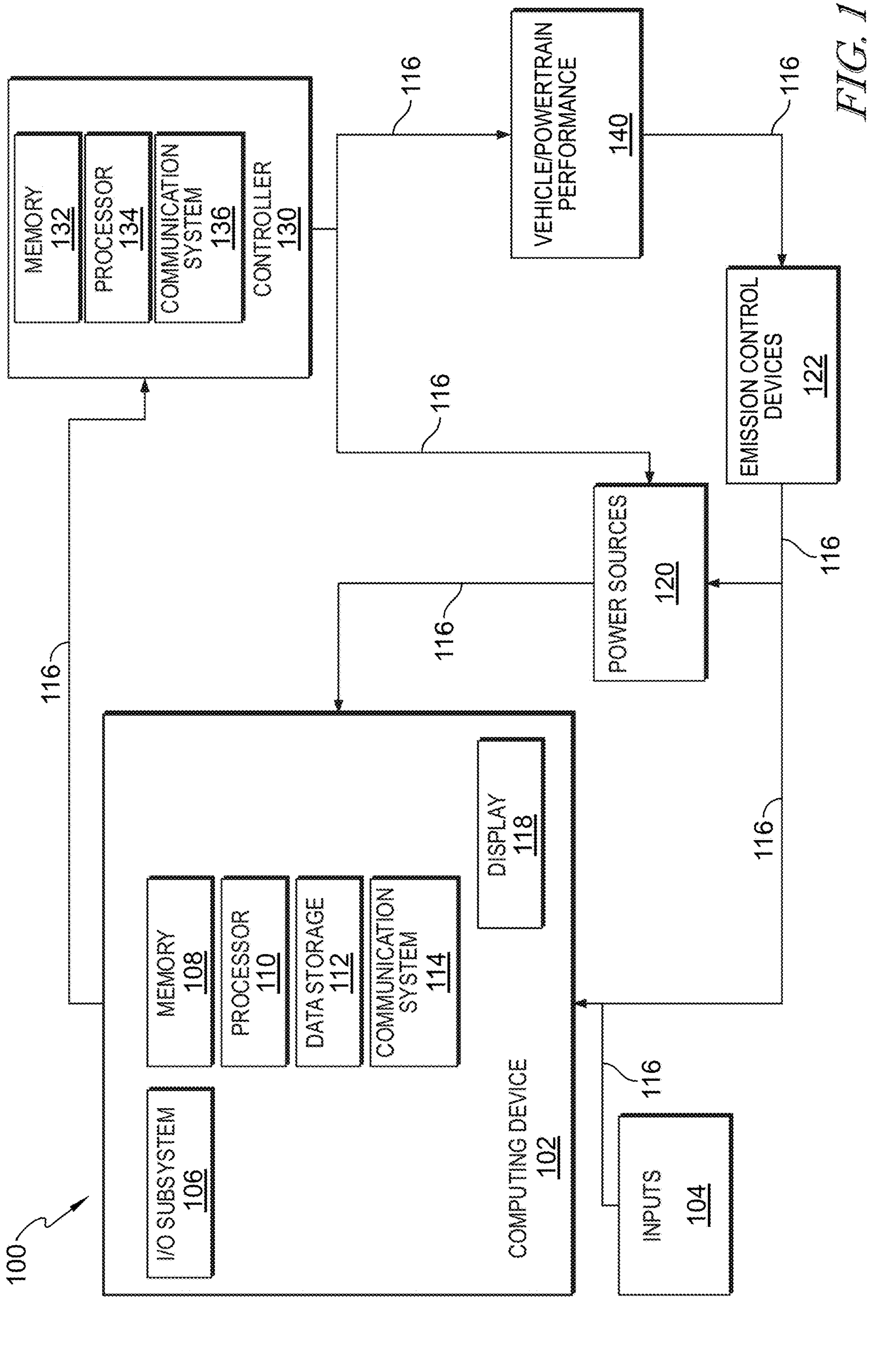
FIG. 1 is a block diagram of one embodiment of a method or system comprising an emissions control strategy to decrease emissions.

The present disclosure relates to a method and a system (e.g., a control system) that includes determining, applying, managing, and/or controlling an emission criteria strategy that satisfies the power requirements of a vehicle and/or powertrain. More specifically, the method and system of the present disclosure includes determining an emission criteria management strategy for managing the power split in a vehicle and/or powertrain having one or more power sources based on performance and emissions criteria. Furthermore, the present disclosure provides a method and system for managing and/or controlling emissions by applying specific power and emission management strategies when the vehicle and/or powertrain enters a location with a regulated or restrictive emission criteria.

A vehicle and/or powertrain of the present method or system may be powered by one or more of any type of a power source. An illustrative power source of the present method or system may include but is not limited to an engine (e.g., an internal combustion engine (ICE), a diesel engine, a hydrogen powered engine, etc.), a fuel cell or a fuel cell stack, and/or a battery. An exemplary power source may at least include a battery of a hybrid power source comprising at least two different types of power sources.

In another embodiment, a vehicle and/or powertrain may be powered by a fuel cell or fuel cell stack and a battery (e.g., a fuel cell or fuel cell stack/battery hybrid power source). In one embodiment, a vehicle and/or powertrain may be powered by a battery and a diesel engine (e.g., a battery/diesel engine hybrid power source). In another embodiment, a vehicle and/or powertrain may be powered by a fuel cell or fuel cell stack, a battery, and a diesel engine (e.g., a fuel cell or fuel cell stack/battery/diesel engine hybrid power source).

In one embodiment, a vehicle and/or powertrain may be powered by any one or more power sources that is not a diesel engine. In some embodiments, a vehicle and/or powertrain may be powered by one or more power sources that is not an internal combustion engine. In other embodiments, a vehicle and/or powertrain may be powered by one or more power sources that is not a hydrogen powered engine. In further embodiments, a vehicle and/or powertrain may be powered by one or more power sources that is not an engine.

Using a hybrid power source, such as a battery/engine hybrid power source, a fuel cell or fuel cell stack/battery hybrid power source, or a fuel cell or fuel cell stack/battery/engine hybrid power source, independently and/or coupled with the present method and system (e.g. control system), can result in the generation and application of an emission criteria management strategy that provides management and control of emissions from a vehicle and/or powertrain. Implementation of the one or more hybrid power sources into the infrastructure of the vehicle and/or powertrain of the present methods or systems can ensure any emission criteria management strategy will meet the power needs of the vehicle and/or powertrain while also aligning with the emission criteria and/or regulations of the geographic region where the vehicle and/or powertrain is operating. The present disclosure is directed to a method and a control system for generating an emission criteria management strategy that may be applied and/or implemented in a vehicle and/or powertrain to achieve regulatory readiness or compliance before the vehicle and/or powertrain approaches or enters a restricted or regulated geographic region.

The present disclosure is further directed to an application or implementation of the emission criteria management strategy in the vehicle and/or powertrain as it approaches, is in vicinity of, enters, idles, docks, parks, and/or exits the restricted region. The emission criteria management strategy may be a geofencing strategy. A geofencing strategy considers and implements mechanisms to ensure acceptable emissions and emittants limits and restrictions for operating any vehicle and/or powertrain within a given boundary/region are met.

Emissions and/or emittants for which the present system and method are utilized to keep in compliance within restricted regions or zone many include, but are not limited to any compound or composition known to be hazardous to the environment. Illustrative embodiments of emissions and/or emittants includes, but are not limited to chemicals, compounds, and compositions, such as water, air, fuel, and/or hydrogen, which may be in any form (e.g., gases and vapors, liquids, solids, etc.). Additional embodiments of emissions and emittants of the present system and method include electromagnetic emissions and other electrically-based emissions, such as electromagnetic interference (EMI). Further embodiments of emissions and emittants of the present system and method may include noise.

A restricted or regulated region of the present method or systems may be any geographical area or region with specific emission regulations, limitations, and/or prohibitions. These emission regulations, limitations, and/or prohibitions are typically asserted by a federal, regional, and/or local governing body. Emission readiness or preparedness refers to and may include, but is not limited to, aligning the emissions of a vehicle and/or powertrain with established or pending regulations in the restricted region via dumping, exhausting, tanking, dilution, purging, or other various methods. Emission readiness also includes determining the availability and/or the amount of the required power needed to compliantly enter, operate, function, and/or exit the restricted region.

In one embodiment, the vehicle and/or powertrain may be a vessel, a marine vehicle or vessel, a train, a locomotive, a bus, a trolley, or a mining equipment. In other embodiments, the vehicle and/or powertrain may be situated on or configured to be located on or attached to a vessel, a marine vehicle or vessel, a train, a locomotive, a bus, or a mining equipment. In one embodiment, the vehicle and/or powertrain may be an equipment or a device used on rail, used on the waterways, used on-highways, used off-highways, used in high altitude regions, or used underground.

In one embodiment, the vehicle and/or powertrain may comprise or be attached to a vessel used in the air. For example, the vehicle and/or powertrain may be or attached to a plane, a helicopter, or other aircrafts or aerial crafts (e.g., a drone or a hot air balloon). In another embodiment, the vehicle and/or powertrain of the present system or method does not comprise a plane, a helicopter, or any aircraft, aerial craft, or other type of vessel used in the air.

The disclosed embodiments of the present emission criteria management strategy may be implemented, in some cases, in hardware, firmware, software, or any combination thereof. The disclosed embodiments of the emission criteria management strategy may also be implemented as instructions carried by or stored on a transitory or non-transitory machine-readable (e.g., computer-readable) storage medium, which may be read and executed by one or more processors. The disclosed embodiments may be initially encoded as a set of preliminary instructions (e.g., encoded on a machine-readable storage medium) that may require preliminary processing operations by a source compute device (e.g., the device that is to send the instructions), such as one or more processors, to prepare the instructions for execution on a destination compute device (e.g., a device that receives and execute the instructions).

In one embodiment, preliminary processing of the emission criteria management strategy may be performed. Preliminary processing of the emission criteria management strategy may include combining the instructions with data present on a device, translating the instructions to a different format, performing compression, decompression, encryption, and/or decryption, combining multiple files that include different sections of the instructions, integrating the instructions with other code or information present on a device, such as a library or an operating system, or similar operations.

Preliminary processing may be performed by a source computing device, the destination computing device, or an intermediary computing device. A machine-readable storage medium may be embodied as any storage device, mechanism, or other physical structure for storing or transmitting information in a form readable by a machine (e.g., a volatile or non-volatile memory, a media disc, or other media device).

One embodiment of the present control system 100 for generating an emission criteria management strategy that may be applied and/or implemented in a vehicle and/or powertrain to achieve regulatory readiness or compliance before the vehicle and/or powertrain enters a restricted or regulated geographic region is diagrammatically illustrated in FIG. 1.

To facilitate the transfer of data and other network communications across the control system 100, the control system 100 includes a computing device 102 in communication over a network 116 with other components of the control system 100 including but not limited to a controller 130, one or more power sources 120 in the vehicle and/or powertrain, one or more emission control devices or components 122, and other components 140 of the vehicle and/or powertrain that determine function and performance.

The computing device 102 may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The illustrative computing device 102 of FIG. 1 may include one or more of an input/output (I/O) subsystem 106, a memory 108, a processor 110, a data storage device 112, a communication subsystem 114, and a display 118 that may be connected to each other, in communication with each other, and/or configured to be connected and/or in communication with each other through wired, wireless and/or power line connections and associated protocols (e.g., Ethernet, InfiniBand®, Bluetooth®, Wi-Fi®, WiMAX, 3G, 4G LTE, 5G, etc.).

The computing device 102 may also include additional and/or alternative components, such as those commonly found in a computer (e.g., various input/output devices). In other embodiments, one or more of the illustrative computing device 102 of components may be incorporated in, or otherwise form a portion of, another component. For example, the memory 108, or portions thereof, may be incorporated in the processor 110.

The processor 110 may be embodied as any type of computational processing tool or equipment capable of performing the functions described herein. For example, the processor 110 may be embodied as a single or multi-core processor(s), digital signal processor, microcontroller, or other processor or processing/controlling circuit. The memory 108 may be embodied as any type of volatile or non-volatile memory or data storage capable of performing the functions described herein.

In operation, the memory 108 may store various data and software used during operation of the computing device 102 such as operating systems, applications, programs, libraries, and drivers. The memory 108 is communicatively coupled to the processor 110 via the I/O subsystem 106, which may be embodied as circuitry and/or components to facilitate input/output operations with the processor 110, the memory 108, and other components of the computing device 102.

For example, the I/O subsystem 106 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

In one embodiment, the memory 108 may be directly coupled to the processor 110, for example via an integrated memory controller hub. Additionally, in some embodiments, the I/O subsystem 106 may form a portion of a system-on-a-chip (SoC) and be incorporated, along with the processor 110, the memory 108, and/or other components of the computing device 102, on a single integrated circuit chip (not shown).

The data storage device 112 may be embodied as any type of device or devices configured for short-term or long-term storage of data such as, for example, memory devices and circuits, memory cards, hard disk drives, solid-state drives, or other data storage devices. The computing device 102 also includes the communication subsystem 114, which may be embodied as any communication circuit, device, or collection thereof, capable of enabling communications between the computing device 102 and other remote devices over the computer network 116.

The components of the communication subsystem 114 may be configured to use any one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.) to effect such communication among and between system components and devices. The controller 130, the power sources 120, the emission control devices or components 122, the computing device 102, and additional features or components 140 of the vehicle and/or powertrain may be connected, communicate with each other, and/or configured to be connected or in communication with each over the network 116 using one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.).

The computing device 102 may also include any number of additional input/output devices, interface devices, hardware accelerators, and/or other peripheral devices. The computing device 102 of the control system 100 of a vehicle and/or powertrain may be configured into separate subsystems for managing data and coordinating communications throughout the vehicle and/or powertrain.

The display 118 of the computing device 102 may be embodied as any type of display capable of displaying digital and/or electronic information, such as a liquid crystal display (LCD), a light emitting diode (LED), a plasma display, a cathode ray tube (CRT), or other type of display device. In some embodiments, the display 118 may be coupled to or otherwise include a touch screen or other input device.

In one embodiment, an emission criteria management strategy is generated by the processor 110 based on several inputs 104, and applied or implemented by a controller 130 to affect the functioning of the vehicle and/or powertrain. The inputs 104 are provided by an operator or publicly or privately available information. In one embodiment, an emission criteria management strategy is generated by the processor 110 based on several inputs 104, and applied or implemented by a controller 130 in real time or automatically to affect the functioning of the vehicle and/or powertrain. In one embodiment, the controller 130 is in the same computing device 102 as the processor 110. In other embodiments, the controller 130 may include a memory 132, a processor 134, and a communication system 136, as previously described.

Generation of the emission criteria management strategy also depends on the power sources 120 in the vehicle and/or powertrain and the information about the performance and emission that the processor 110 can access from each power source 120 present in the vehicle and/or powertrain over the communication network 116. The controller 130 is capable of controlling operational functionality and/or performance of the power sources 120 (e.g., fuel cell or fuel cell stack, engine, and/or battery) and other equipment and/or parts included in the vehicle and/or powertrain to ultimately control or manage emissions of the vehicle and/or powertrain.

The controller 130 may control the operational functionality and/or performance of various aspects 140 of the vehicle and/or powertrain. For example, the controller 130 may be configured to be connected to and/or in communication with emission control devices or components 122 including but not limited to valves, pipes, lines, wires, modems, conduits, manifolds, actuators, sensors, storage tanks (e.g., water, hydrogen, air, and/or fuel storage tanks), batteries, air supply, motors, generators, and drive trains. The emission control devices or components 122 may alter, decrease, increase, negate, or enhance the function or performance of the one or more power sources 120.

In one embodiment, the emission criteria management strategy is applied or implemented by a controller 130 present on the vehicle and/or powertrain. In other embodiments, the emission criteria management strategy is applied or implemented by a controller that is not present on the vehicle and/or powertrain. In other embodiments, the emission criteria management strategy is applied or implemented by a controller that is remotely, automatically, programmatically, systemically, or locally controlled and/or activated on the vehicle and/or powertrain, such as by a user or an operator.

In one embodiment, the generation of the emission criteria management by the processor 110 and the application or implementation of the emission criteria management strategy by the controller 130 may occur in restricted or regulated geographic regions. Restricted or regulated geographic regions include but are not limited to port emission control areas, underground facilities (e.g., underground tunnels and stations), gas or refueling stations, buildings, bus depots, mining regions, parking lots, barns, bridges, tunnels (e.g. above-ground tunnels), aerial zoning, and dams.

In one embodiment, the generation of the emission criteria management strategy by the processor 110 and the application or implementation of the emission criteria management strategy by the controller 130 may be in a vehicle and/or powertrain that enters any structure. In one embodiment, the generation of the emission criteria management strategy by the processor 110 and the application or implementation of the emission criteria management strategy by the controller 130 may be in a vehicle and/or powertrain that enters any structure that may cause a chemical and/or thermal event. In other embodiments, the generation of the emission criteria management strategy by the processor 110 and the application or implementation of the emission criteria management strategy by the controller 130 may be in a vehicle and/or powertrain that enters any structure that may accumulate hydrogen.

Hydrogen has a lower flammability limit (LFL) of about 4% by volume, such that at, around, or about 4% accumulated hydrogen may become dangerous and/or flammable. Of particular importance for implementation of the present system and method are structures that do not include any or appropriate hydrogen ventilation mechanisms. For example, underground structures where proper ventilation of hydrogen may be impeded are ideal for the present system and method. Proper hydrogen ventilation prevents and/or reduces the likelihood that hydrogen may become hazardous, dangerous, and/or flammable.

Accordingly, the present system and method are capable of maintaining, reducing, storing, exhausting, removing, purging, and/or controlling emissions, and emittants, particularly hydrogen emissions to a level that is at or below 4% by volume. In some embodiments, the system and method include a ventilation system or subsystem that may remove hydrogen from the vehicle and/or powertrain in order to prevent hydrogen accumulation above 4% by volume. In some embodiments, the system and method include a ventilation system or subsystem that may maintain, reduce, store, exhaust, remove, purge, and/or control the hydrogen of the vehicle and/or powertrain in order to prevent hydrogen accumulation above 4% by volume.

In some embodiments, the hydrogen accumulation of the vehicle and/or powertrain is maintained to a level that ranges from about 0.1% to about 4% by volume, including any specific percentage comprised therein. In further embodiments, the hydrogen accumulation of the vehicle and/or powertrain is maintained at a level that ranges from about 0.1% to about 3.9% by volume, including any specific percentage comprised therein. In some embodiments, the hydrogen accumulation of the vehicle and/or powertrain is maintained at a level that ranges from about 0.5% to about 3.5%, about 1% to about 3.5%, about 1% to about 3.9%, about 1.5% to about 3.5%, about 2% to about 3%, about 2% to about 4%, about 2.5% to about 3.9%, about 2% to about 3%, about 3% to about 4%, and about 3% to about 3.9% by volume.

The hydrogen ventilation and maintenance of the present system and method are structural and systematic features and capabilities that prevent and/or reduce conditions that may cause hydrogen to become encaptured, unventilated, and/or unable to freely exhaust. In some embodiments, the present system and method may comprise any component known to aid in air flow and/or ventilation. In illustrative embodiments, the present methods and systems may comprise one or more fans, blowers, exhausts or exhaust systems, etc. The hydrogen ventilation and maintenance features further provide an improvement over current systems that may not maintain reduce, exhaust, purge, and/or control the concentration or levels of hydrogen in a volume.

In one embodiment, the generation of the emission criteria management strategy by the processor 110 includes identifying a primary power source selected from all the available power sources 120 in a vehicle and/or powertrain to be used in or in the vicinity of a restricted region. The primary power source may be a single power source or a combination of more than one power source.

In one embodiment, the primary power source may be a prime mover. In some embodiments, the primary power source may be a hydrogen powered prime mover. In other embodiments, the primary power source may comprise multiple movers, such as a prime mover and a secondary mover.

In one embodiment, the power sources 120 in a vehicle and/or powertrain may include an engine (e.g., an internal combustion engine (ICE), a diesel engine, a hydrogen powered engine etc.), and a battery. In other embodiments, the power sources 120 in a vehicle and/or powertrain may include an engine, a fuel cell or fuel cell stack, and a battery. In further embodiments, the power sources 120 in a vehicle and/or powertrain may include a fuel cell or fuel cell stack and a battery. In still further embodiments, the power sources 120 may consist essentially of a fuel cell or fuel cell stack and a battery.

In one embodiment, the power sources 120 in a vehicle and/or powertrain may include an engine and a fuel cell or fuel cell stack, and the primary power source in the restricted region may be the fuel cell or fuel cell stack. In other embodiments, the power sources 120 in a vehicle and/or powertrain may include an engine, a fuel cell or fuel cell stack, and a battery, and the primary power source in the restricted region may be the battery.

In one embodiment, the power sources 120 in a vehicle and/or powertrain may include an engine, a fuel cell, and a battery, and the primary power source in the restricted region may be a combination of the fuel cell or fuel cell stack and the battery. In other embodiments, the power sources 120 in a vehicle and/or powertrain may include a fuel cell or fuel cell stack and a battery, and the primary power source in the restricted region may be the battery. In a further embodiment, the power sources 120 in a vehicle and/or powertrain may include a fuel cell or fuel cell stack and a battery, and the primary power source in the restricted region may be the fuel cell or fuel cell stack or the battery.

In one embodiment, the generation of the emission criteria management strategy by the processor 110 may include identifying the power needs of a vehicle and/or powertrain based on certain inputs 104. These inputs 104 may include but are not restricted to global positioning systems (GPS), geofencing restrictions and regulations, fuel cost, etc. Inputs 104 may also include look ahead data and information, such as weather, road and/or sea conditions, or specific emission requirements in restricted regions. For example, in one embodiment, the emission requirements may relate to the amount and/or concentration of chemicals or compounds present in the exhaust of the vehicle and/or powertrain.

In one embodiment, the emission requirements may relate to the amount or concentration of hydrogen, water, or a different chemical, compound, or emission factor present in the exhaust or other emittants from the vehicle and/or powertrain, such as electromagnetic emittants, electromagnetic interference, and/or noise. In other embodiments, the generation of the emission criteria management strategy by the processor 110 may include determining the power needs of a vehicle and/or powertrain based on a look ahead estimator (not shown) that provides the look ahead data and/or information as an input 104. In one embodiment, an electronic horizon system may provide look ahead data and/or information as input 104.

In one embodiment, generation of the emission criteria management strategy by the processor 110 may include receiving inputs 104 directly or from the computing device 102 to generate the strategy as the vehicle approaches, enters, or resides in a restricted or regulated region. In one embodiment, generation of emission criteria management strategy by the processor 110 may include receiving inputs 104 to generate the strategy before the vehicle approaches the restricted region in order to ensure that emissions of the vehicle and/or powertrain are compliant with the regulations of the restricted region.

In some embodiments, the emission criteria management strategy may be generated and implemented based on distance from the vehicle and/or powertrain to the entry and/or exit of the restricted region or zone. In some embodiments, the emission criteria management strategy may be generated and implemented based on the current speed or velocity of the vehicles and/or powertrain as it approaches or travels within the restricted region or zone. In some embodiments, the emission criteria management strategy may be generated and implemented based on the time required to start, shut down, initiate, charge, or refuel the one or more power sources on the vehicle and/or powertrain. In other embodiments, the emission criteria management strategy may be generated and implemented based on one or more of all of these factors (e.g., distance, speed/velocity, power source startup or shutdown timing, etc.).

The generation of the emission criteria management strategy by the processor 110 may include receiving inputs 104 that may enable determination of the duration of time for which power is needed in the restricted region. In one embodiment, the duration for which power is needed may be the duration that the vehicle and/or powertrain is present in the restricted region. In other embodiments, the duration for which power is needed may be different. In one embodiment, the generation of the emission criteria management strategy by the processor 110 may include determining the power required for maneuvering the vehicle and/or powertrain in the restricted region. In other embodiments, the generation of the emission criteria management strategy by the processor 110 may include determining the power required to power the vehicle and/or powertrain while stationed in the restricted region.

In one embodiment, the generation of the emission criteria management strategy by the processor 110 may include determining the power required to power the vehicle out and exit the restricted region. In other embodiments, the generation of the emission criteria management strategy by the processor 110 may include receiving inputs 104 to determine the power required by the one or more primary power sources for the vehicle and/or powertrain to cross the entire length of the restricted region.

In one embodiment, the primary power sources may need to provide power for the vehicle and/or powertrain to cross a distance about 20 km longer than the length of the restricted region. In other embodiments, the primary power sources may need to provide power to the vehicle and/or powertrain to cross a distance about 50 km longer than the length of the restricted region. In other embodiments, the primary power source may need to provide power to the vehicle and/or powertrain to cross a distance about 100 km longer than the length of the restricted region.

In one embodiment, generation of the emission criteria management strategy by the processor 110 may include using a battery as the primary source in the restricted region. Generation of the emission criteria management strategy by the processor 110 may include getting inputs 104 that may enable determination of when to charge the battery. In other embodiments, the generation of the emission criteria management strategy by the processor 110 may include getting inputs 104 that may enable determination of how much to charge the battery.

In one embodiment, generation of the emission criteria management strategy by the processor 110 may include a method to determine if the power sources 120 in the vehicle and/or powertrain or any of the inputs 104 needed to generate the emission criteria management strategy by the processor 110 have been tampered with or altered. In some embodiments, vehicle to infrastructure (V2I) communication or manual action by an operator may be implemented to validate the emission criteria management strategy and determine if tampering is detected. For example, if a battery charging strategy has been altered or a fuel treatment system has been compromised either by software or hardware tampering, validation of such tampering and correction or compensation of the appropriate emissions criteria management strategy may be performed automatically (e.g., by the processor and controller) or manually by an operator.

In one embodiment, validation of the emission criteria management strategy generated by the processor 110 may be performed to safeguard the power sources 120 and prevent any damage to them. In some embodiments, the power sources 120, such as the fuel cells, fuel cell stack or battery, may be safeguarded against over-heating, over use, improper utilization, wear and tear, improper charging and/or improper start-up or shutdown. In other embodiments, validation may be performed to review all inputs 104 used to generate the emission criteria management. In some embodiments, the validation may be performed automatically (e.g., by the processor and controller) or manually by an operator.

In one embodiment, the emission criteria management strategy generated by the processor 110 may be tailored by an operator based on the operating condition of the power sources 120, review of the inputs 104, review of any tampering, the location and/or laws governing the region where the vehicle and/or powertrain is operating, or the time required by the vehicle and/or powertrain to enter, operate in and/or exit the region. Tailoring refers to manipulation of the system and/or method inputs, controls, and/or performance by an operator. Typically, tailoring is warranted and utilized when specific, detailed, and/or updated information is available to an operator than what is available via inputs 104 of the present system or method at the time the manipulation or tailoring occurs. In some embodiments, an operator may use tailoring to aid in the identification of a restricted region or navigation through a restricted region or zone.

In one embodiment, generation of the emission criteria management strategy by the processor 110 may include accumulating and/or storing water waste as result of using the primary power source in the restricted region. This water waste may be purged and/or vaporized. In other embodiments, generation of the emission criteria management strategy by the processor 110 may include draining any water waste or recycling any water waste back into the system, such as for cooling and/or dilution purposes.

In one embodiment, generation of the emission criteria management strategy by the processor 110 may include inputs 104 and/or criteria regarding electromagnetic emittants, such as electromagnetic interference (EMI) by the vehicle and/or powertrain. In another embodiment, generation of the emission criteria management strategy by the processor 110 may include inputs 104 and/or criteria regarding noise production by the vehicle and/or powertrain. For example, the decibels of noise and/or sound emitted from the vehicle and/or powertrain or its power sources may be an input 104 to the processor 110 so that those requirements are further communicated to the controller 130 to control and manage the noise or sound.

In an exemplary embodiment, the vehicle is a marine vessel and the restricted location is a sea port. In some embodiments, the marine vessel is powered by an engine, a fuel cell or fuel cell stack, and a battery. In order to comply with regulations and restrictions on noise and/or reduce the decibels of noise emitted from the marine vessel as it approaches the waterway port, the application or implementation of the emission criteria management strategy by the controller 130 may include transitioning from the engine to the fuel cell or to the battery power source or vice versa. In one embodiment, in order to monitor noise, emissions, or emittants as the marine vessel approaches the sea port, the generation of the emission criteria management strategy by the processor 110 may include transitioning from a fuel cell to a battery power source or vice versa. In other embodiments, the marine vessel may utilize different primary power sources in different zones in order to comply with regulations and restrictions on noise, emissions, and/or emittants.

In one embodiment, the marine vessel may be powered by one or more fuel cells or fuel cell stacks and a battery. In order to comply with regulations and restrictions on emissions or emittants, such as noise and/or to reduce the decibels of noise emitted from the marine vessel as it approaches a waterway port, the application or implementation of the emission criteria management strategy by the controller 130 may include transitioning from the one or more fuel cells or fuel cell stacks to the battery power source or vice versa. In one embodiment, in order to monitor noise, emissions, and/or emittants, as the marine vessel approaches the sea port, the generation and implementation of the emission criteria management strategy by the processor 110 may include transitioning from the one or more fuel cells or fuel cell stacks to a battery power source or vice versa while approaching or in one or more zones.

In one embodiment, the generation of the emission criteria management strategy by the processor 110 may include getting additional inputs 104, such as radiator noise criteria, associated with a fuel cell or battery state of charge (SoC). If the power sources in a vehicle and/or powertrain are an engine and a battery, the vehicle and/or powertrain may be sensitive to the battery SoC. In other embodiments, if the battery is powered by a fuel cell or fuel cell stack, the vehicle and/or powertrain may be less sensitive to the battery SoC because the fuel cell or fuel cell stack may be able to power the battery.

In one embodiment, the generation of the emission criteria management strategy by the processor 110 may include engaging only a subset of fuel cells or fuel cell stacks present on the vehicle and/or powertrain. In other embodiments, the vehicle and/or powertrain is powered by an engine, a fuel cell or fuel cell stack, and a battery. Generation of the emission criteria management strategy by the processor 110 may include utilizing different power sources in different geographic and/or restricted or regulated regions. A zone refers to a geographic area located within a specific distance or vicinity from the restricted region or a particular location in the restricted region.

In some embodiments, a restricted region may be comprise one or more zones. In another embodiment, a restricted region may be surrounded by multiple zones. For example, a vehicle would typically travel through one or more zones in order to reach the restricted region.

In one embodiment, any restricted region may include one or more zones. In some embodiments, a restricted region may comprise at least two zones. In an exemplary embodiment, a restricted region may comprise two or more zones, such as three zones. There is no limit to the number or distance the zones may comprise within the vicinity of the restricted region.

For example, a train, a locomotive or any vehicle and/or powertrain comprising one or more power sources 120 may approach a tunnel (e.g., a restricted region) comprising one or more zones. In one embodiment, the region outside the entrance of the tunnel, the region inside the tunnel, and the region exiting the tunnel could each include one or more zones. The emission criteria management strategy generated by the processor 110 and implemented by the controller 130 to communicate to one or more of the power sources 120 may result in the train or locomotive or any vehicle and/or powertrain using one or more power sources as the primary power source in each of the multiple different zones.

Figure 2:
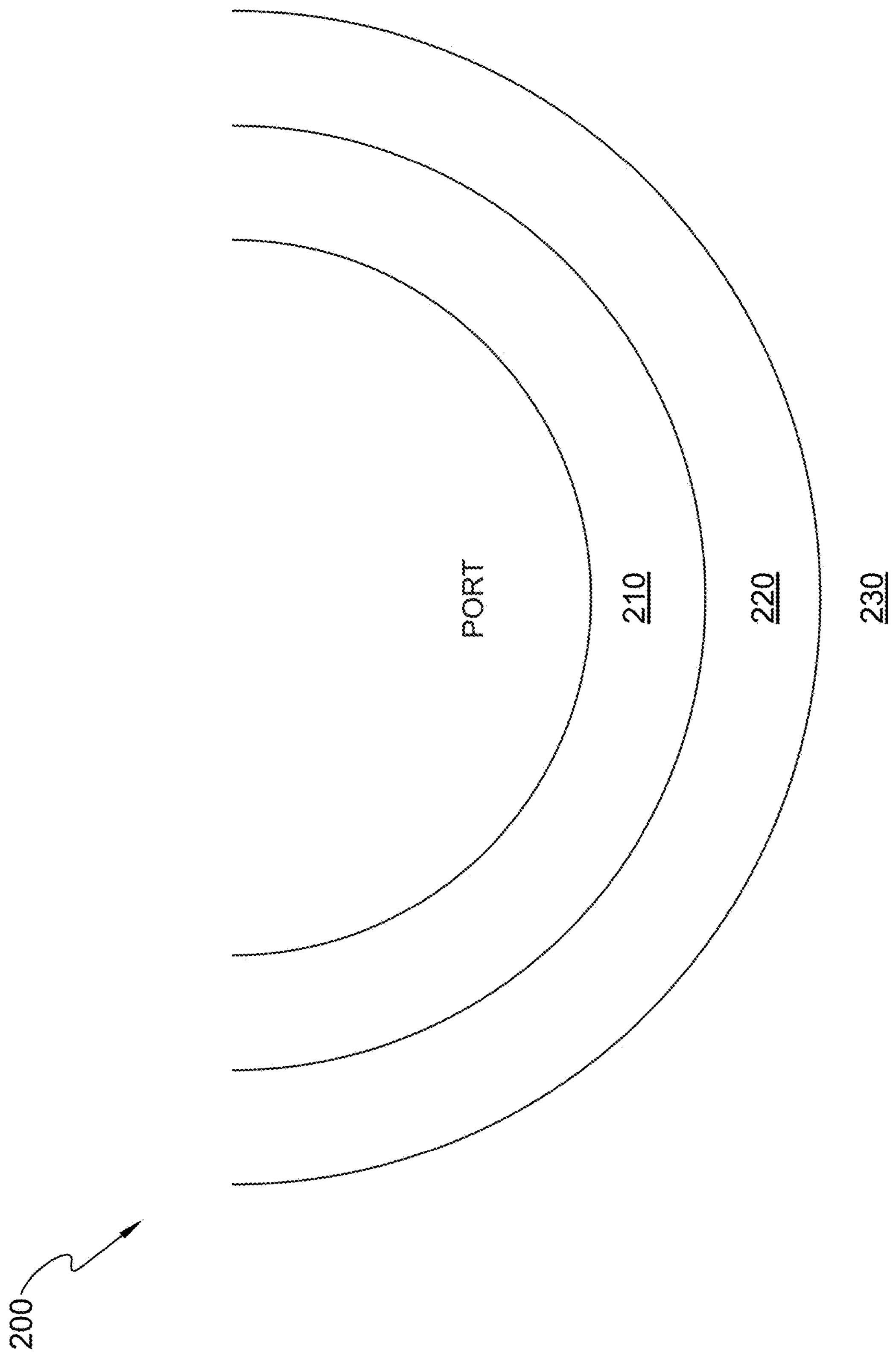
FIG. 2 is a schematic showing an embodiment of a marine emissions map comprising different zones that will be encountered by a vehicle and/or powertrain approaches a waterway port, such as an ocean or sea port.

FIG. 2 illustrates another example of an emission criteria management strategy 200 that may be generated by the processor 110 and implemented by a controller 130 of a vehicle and/or powertrain that approaches a restricted region, such as a waterway port. In some embodiments, the waterway port is an ocean or a sea port. In some embodiments, the restricted region of the sea port may comprise one or more zones 210, 220, 230.

The emission criteria management strategy 200 generated by the processor 110 and implemented by the controller 130 to communicate to one or more of the power sources 120 that may result in a switch in power sources. For example, a vehicle and/or powertrain may switch from using an engine as the primary power source 120 in the open sea 230 (first, farthest zone from the waterway port) to using a fuel cell or fuel cell stack as the primary power source 120 when the vehicle and/or powertrain crosses into a second, middle zone 220 (e.g., a particular distance from the waterway port). The vehicle and/or powertrain may switch power sources 120 again from using the fuel cell or fuel cell stack as the primary power source 120 to using a battery as the primary power source 120 when the vehicle and/or powertrain reaches a third, closest zone 210 closer to and/or directed before entering the waterway port typically imposing specific restrictions and regulations on vehicle emissions.

In one embodiment, a vehicle and/or powertrain approaching the restricted region, such as a waterway port, may be powered by a fuel cell or fuel cell stack and a battery. The emission criteria management strategy 200 generated by the processor 110 and implemented by the controller 130 to communicate to one or more of the power sources 120 may result in using a fuel cell or fuel cell stack as the primary power source in some of the zones 210, 220, 230, and the battery as the primary power source in some other of the zones 210, 220, 230.

In one embodiment, a vehicle and/or powertrain approaching a restricted region may be powered by one or more power sources 120. In one embodiment, each power source 120 may be a primary power source. In another embodiment, the primary power source may be one or more fuel cell or fuel cell stacks. In a further embodiment, the primary power source may be one or more batteries. In an additional embodiment, the primary power source may be or include an engine, while in a further embodiment, the primary power source may not be or include an engine.

One or more emission criteria management strategies may be generated by the processor 110 and implemented by the controller 130 to independently communicate to each specific power source 120, such as each primary power source. For example, a first emission criteria management strategy may be generated by the processor 110 and implemented by the controller 130 to selectively control a first primary power source (e.g., a fuel cell or fuel cell stack) of a vehicle and/or powertrain. Similarly, a second emission criteria management strategy may be generated by the processor 110 and implemented by the controller 130 to selectively control a second primary power source (e.g., a battery) of the vehicle and/or powertrain. Additional emission criteria management strategies may be generated by the processor 110 and implemented by the controller 130 to selectively control additional primary power sources located within the vehicle and/or powertrain.

Accordingly, the present vehicle and/or powertrain may include a method and system that utilizes a first emission criteria management strategy that may be generated by the processor 110 and implemented by the controller 130 to independently communicate to a first primary power source and a second emission criteria management strategy that may be generated by the processor 110 and implemented by the controller 130 to independently communicate to a second primary power source.

The method further comprises selectively controlling the first primary power source with the first emission criteria management strategy and selectively controlling the second primary power source with the second emission criteria management strategy. In some embodiments, the one or more emission criteria management strategies may implement selective utilization of the more than one fuel cell stacks. In one embodiment, more than one emission criteria management strategies may be generated and implemented in one zone. In other embodiments, more than one emission criteria management strategies may be generated in more than one zones. For example, implementing the emission criteria management strategy and/or controlling the first or second primary power source may further comprise diluting fuel or hydrogen in the emissions, moving a portion of the emissions into an internal tank, purging hydrogen from the primary power source and/or the vehicle and/or powertrain, or decreasing the hydrogen content in the emissions by changing the one or more primary power sources used to provide power to the vehicle and/or powertrain.

In addition to selectively utilizing a first primary power source and/or a second primary power source, selective utilization of the one or more power sources of the present method and system, such as the first primary power source and/or the second primary power source may include utilizing only a portion of the primary power source versus the full primary power source. In one embodiment, the vehicle and/or powertrain may comprise a primary power source that comprises one or more multiple power sources. For example, a vehicle or powertrain may have a primary power source that comprises multiple, duplicative power sources, such as multiple fuel cell stacks, multiple batteries, or combinations thereof.

In an illustrative embodiment, a primary power source of the present vehicle and/or powertrain may be a fuel cell stack. The fuel cell stack may comprise one or more, multiple, and/or a plurality of fuel cells. As is known in the art, the plurality of fuel cells may be configured to be connected and/or stacked in series in order for the fuel cell stack to generate the required power to operate the vehicle and/or powertrain.

During selective utilization of a primary power source, such as a first fuel cell stack, the emission criteria management strategy of the present method or system may be generated by the processor 110 and implemented by the controller 130 to operate only a portion of the fuel cell stack in order to reduce emissions down to an acceptable level (e.g., within guidelines or restrictions) and/or prevent emissions altogether.

In an illustrative embodiment, selective utilization of a fuel cell stack comprising multiple fuel cells may include limiting, reducing, and/or regulating the number of fuel cells that are operational. For example, a fuel cell stack comprising 12 fuel cells, may operate only a portion of the fuel cell stack, such as any subset or number of fuel cells (e.g., only 10 fuel cells, 6 fuel cells, or 4 fuel cells) that provide the necessary power while reducing the amount of emissions or emittants to an acceptable level.

In an additional embodiment, selective utilization of a fuel cell stack comprising multiple fuel cells may include limiting, reducing, and/or regulating the power capacity provided by any proportion of fuel cells of total fuel cell stack that is operational. For example, a fuel cell stack comprising any number of fuel cells operating at 100% capacity may be selectively utilized to operate at any capacity ranging from 0% to about 100%, including any specific operational capacity percentage comprised therein.

In an exemplary embodiment, a fuel cell stack may be utilized to operate at about 1% to about 99% (including any specific operational capacity percentage comprised therein), at about 5% to about 95%, at about 10% to about 90%, at about 20% to about 80%, at about 30% to about 70%, at about 40% to about 60%, at about 45% to about 50%. In an illustrative embodiment, a fuel cell stack having 12 fuel cells and selectively utilizing a portion of its fuel cells to operate at about 50% capacity will have about 6 fuel cells operationally functional. In another embodiment, a fuel cell stack having 12 fuel cells and selectively utilizing a portion of its fuel cells to operate at about 30% capacity will have about 4 fuel cells operational. This ability to selectively utilize a portion or specific operational capacity of a primary power source, such as a fuel cell stack, is a specific advantage of the present method and system.

In one embodiment, the power efficiency and cost tradeoffs for any vehicle and/or powertrain including the present method and/or systems may be optimized. More specifically, generation of the present emission criteria management strategy may indicate and therefore implement controls to enable or manage the charging of the battery before reaching any zone where it is required to be used as a primary power source 120. In one embodiment, the assessment and precharging of any primary power source, such as a battery is critical to ensuring readiness of the one or more power sources in a vehicle and/or powertrain to successfully enter a restricted area, travel from one zone to another zone or more zones, and/or exit the restricted region.

Referring back to FIG. 2, in some embodiments, the battery 120 may be charged in the open sea 230 before reaching, entering, or breaching a restricted region or a zone. In other embodiments, the battery can be charged while in a zone 220 and/or before reaching another zone 210. In further embodiments, the battery may be charged while the vehicle and/or powertrain is within more than one zone.

Referring back to FIG. 1, in one embodiment, the application, or implementation of the emission criteria management strategy by the controller 130 may result in charging the battery prior to entering the restricted region. In one embodiment, the application or implementation of the emission criteria management strategy by the controller 130 may result in charging the battery such that the battery is the primary power source 120 for the duration of time that the vehicle and/or powertrain is present in the restricted region.

In one embodiment, the application or implementation of the emission criteria management strategy by the controller 130 may result in charging the battery such that the battery can provide power for the vehicle and/or powertrain to cross the entire length of in the restricted region. In other embodiments, the battery is charged so that the battery can provide power for a distance that is about 20 km longer the length of the restricted region. In one embodiment, the battery is charged so that the battery can provide power for a distance that is about 50 km longer the length of the restricted region. In one embodiment, the battery is charged so that the battery can provide power for a distance that is about 100 km longer the length of the restricted region. In other embodiments, the fuel cell may need to be shut down to ensure that the battery has sufficient charge.

In one embodiment, the application or implementation of the emission criteria management strategy by the controller 130 includes communicating with other components of the vehicle and/or powertrain to enable diluting hydrogen in the exhaust. In other embodiments, the application or implementation of the emission criteria management strategy by the controller 130 includes purging the exhaust or chemicals and/or compounds (e.g., hydrogen) from the vehicle and/or powertrain or moving the exhaust or chemicals and/or compounds (e.g. hydrogen) contained within the exhaust into an internal tank included in the vehicle and/or powertrain. In some embodiments, the application or implementation of the emission criteria management strategy by the controller 130 includes decreasing the production of hydrogen exhaust by using a primary power source 120 that produces less or no hydrogen.

In other embodiments, if hydrogen in the exhaust of the vehicle and/or powertrain is below the regulatory requirements, use of the fuel cell or fuel cell stacks may be reconsidered and/or not implemented by the control system. For example, the vehicle and/or powertrain may be in or approaching a restricted region where the regulation requirement indicates that about 0.1% to about 0.5% of hydrogen is allowable. Inputs 104 to the processor 110 from, for example, one or more sensors (e.g., hydrogen sensors) on the vehicle and/or powertrain, may determine that the vehicle is emitting more than 0.5% hydrogen. Instructions established by the processor 110 may then be communicated to the controller 130 and to further additional vehicle components (e.g., exhaust, tank, etc.) to dilute hydrogen from the exhaust (e.g., by the addition of air) to bring the hydrogen exhaust emissions within compliance of the restricted region. In another embodiments, the hydrogen exhaust may be dumped into an internal tank.

In a further embodiment, the vehicle and/or powertrain may be in a restricted region where the regulation requirement is limited to about 0.5% to about 1% of hydrogen. In one embodiment, the vehicle and/or powertrain may be in a restricted region where the regulation requirement is limited to about 1% to about 5% of hydrogen. In other embodiments, the vehicle and/or powertrain may be in a restricted region where the regulation requirement is limited to no more than about 1% of hydrogen.

In one embodiment, the application or implementation of the emission criteria management strategy by the controller 130 includes purging emissions or emittants from the vehicle and/or powertrain before or while utilizing one or more fuel cells as the primary power source 120. In some embodiments, the application or implementation of the emission criteria management strategy by the controller 130 includes purging excess hydrogen from the vehicle and/or powertrain before or while increasing the utilization of the fuel cells in the fuel cell stack. In other embodiments, the application or implementation of the emission criteria management strategy by the controller 130 includes purging excess hydrogen from the vehicle and/or powertrain to comply with the emission criteria of the restricted region where the vehicle and/or powertrain is operating. In a further embodiment, the application or implementation of the emission criteria management strategy by the controller 130 may include the implementation of hydrogen shut-off sequence that ensures no leakage of gas occurs based on governing and regulatory laws of the region where the vehicle and/or powertrain is operating.

In one embodiment, the application or implementation of the emission criteria management strategy by the controller 130 includes altering, decreasing, increasing, negating, restricting, or enhancing the functionality of the power sources 120 used in or when the vehicle and/or powertrain is in the vicinity of or approaches the restricted region, especially those power sources 120 that are not identified as the primary power source 120 or are identified to not be the primary power source 120. In one embodiment, the application or implementation of the emission criteria management strategy by the controller 130 includes restricting the functionality of the one or more power sources 120 to be used in the restricted region when the vehicle and/or powertrain is in, near, or approaching the restricted region.

In other embodiments, the application or implementation of the emission criteria management strategy by the controller 130 includes controlling, changing, restricting, and/or managing the functionality or power output of the one or more power sources 120. In one embodiment, the controller 130 may alter, decrease, increase, negate, or enhance the functionality and/or the power output of a certain or specific power source 120 of the one or more power sources 120, such as when the vehicle and/or powertrain is in or traveling through one or more different zones of the restricted region.

In one embodiment, readiness, application, and/or implementation of the emission criteria management strategy by the controller 130 includes preparing for, accounting for, and/or managing the time required for a start-up sequence or shutdown sequence of the one or more power sources 120 in the vehicle and/or powertrain. In some embodiments, readiness to implement the present emission criteria management strategy by the controller 130 includes preparing for, accounting for, and/or managing the time required for a start-up sequence or shutdown sequence of a fuel cell, fuel cell stack, engine, and/or a battery.

In a specific embodiment, readiness to implement the present emission criteria management strategy in a vehicle and/or powertrain comprising a fuel cell or fuel cell stack and a battery as the primary power sources 120 includes incorporating time to allow for a start-up and/or shutdown sequence of a fuel cell or fuel cell stack, as well time for sufficient charging of a battery (e.g., by the fuel cell or fuel cell stack). Incorporation of such timing into the present emission criteria management strategy not only ensures successful and compliant travel while entering and exiting a restriction region and/or zone, but also ensure that minimal to no damage is incurred by either power source (e.g., the fuel cell or fuel cell stack and the battery). Insufficient timing to allow for each primary power source to successfully ramp up or down will result in damage to one or both primary power sources.

For example, a typical fuel cell stack may require about 30 seconds to about 30 minutes to start-up or shutdown. In some embodiments, a hydrogen fuel cell stack, such as comprising one or more proton exchange membrane fuel cells also called a polymer exchange membrane fuel cells (PEMFC), may have variable start-up times. In one embodiment the start-up time for a hydrogen fuel cell stack in non-freezing conditions may range from about 30 seconds to about 5 minutes, including any specific time comprised therein, such as from about 30 seconds to about 2 minutes. In another embodiment the start-up time for a hydrogen fuel cell stack in freezing conditions may range from about 30 seconds to about 15 minutes, including any specific time comprised therein, such as from about 30 seconds to about 10 minutes.

In some embodiments, a hydrogen fuel cell stack, such as one comprising one or more PEMFCs, may have variable shutdown times. In one embodiment the shutdown time for a hydrogen fuel cell stack in non-freezing conditions may range from about 30 seconds to about 5 minutes, including any specific time comprised therein, such as from about 1 minute to about 2 minutes. In another embodiment the start-up time for a hydrogen fuel cell stack in freezing conditions may range from about 30 seconds to about 15 minutes, including any specific time comprised therein, such as from about 30 seconds to about 10 minutes.

In one embodiment, the processor 110, the controller 130, the power sources 120 are part of a feedback loop. In one such embodiment, the processor 110 generates the emission criteria management strategy based on inputs 104 from the power sources 120, along with additional inputs 104 from any other source, and the controller 130 implements the generated strategy by altering, decreasing, increasing, negating, or enhancing the function of emission control devices or components 122, which may be linked to the function and performance of the one or more power sources 120.

The above embodiments are described in sufficient detail to enable those skilled in the art to practice what is claimed and it is to be understood that other embodiments may be utilized and that logical, mechanical, and electrical changes may be made without departing from the spirit and scope of the claims. The detailed description is, therefore, not to be taken in a limiting sense.

The following numbered embodiments are contemplated and non-limiting:

1. A method for managing emissions produced by a vehicle and/or powertrain, the method comprising receiving one or more inputs into a processor in the vehicle and/or powertrain, generating an emission criteria management strategy by the processor that communicates with a controller and one or more power sources, wherein the one or more power sources are selected from a fuel cell, a fuel cell stack, a battery, and combinations thereof, implementing the emission criteria management strategy by the controller that communicates with the one or more power sources and one or more emission control devices, controlling the power output of the one or more power sources, and managing the emissions from the one or more emission control devices.
2. The method for managing emissions produced by a vehicle and/or powertrain of clause 1, any other suitable clause, or any combination of suitable clauses, wherein the fuel cell stack includes one or more fuel cells.
3. The method for managing emissions produced by a vehicle and/or powertrain of clause 1, any other suitable clause, or any combination of suitable clauses, wherein at least one of the power sources includes a battery of a hybrid power source comprising at least two different types of power sources.
4. The method for managing emissions produced by a vehicle and/or powertrain of clause 1, any other suitable clause, or any combination of suitable clauses, wherein at least one of the power sources is a fuel cell or fuel cell stack/battery hybrid power source including a fuel cell or fuel cell stack and a battery.
5. The method for managing emissions produced by a vehicle and/or powertrain of clause 1, any other suitable clause, or any combination of suitable clauses, wherein at least one of the power sources is a battery/diesel engine hybrid power source including a battery and a diesel engine.
6. The method for managing emissions produced by a vehicle and/or powertrain of clause 1, any other suitable clause, or any combination of suitable clauses, wherein at least one of the power sources is a fuel cell or fuel cell stack/battery/diesel engine hybrid power source including a fuel cell or fuel cell stack, a battery, and a diesel engine.
7. The method for managing emissions produced by a vehicle and/or powertrain of clause 1, any other suitable clause, or any combination of suitable clauses, wherein at least one of the power sources is not a diesel engine.
8. The method for managing emissions produced by a vehicle and/or powertrain of clause 1, any other suitable clause, or any combination of suitable clauses, wherein at least one of the power sources is not an internal combustion engine.
9. The method for managing emissions produced by a vehicle and/or powertrain of clause 1, any other suitable clause, or any combination of suitable clauses, wherein at least one of the power sources is not a hydrogen powered engine.
10. The method for managing emissions produced by a vehicle and/or powertrain of clause 1, any other suitable clause, or any combination of suitable clauses, wherein at least one of the power sources is not an engine.
11. The method for managing emissions produced by a vehicle and/or powertrain of clause 1, any other suitable clause, or any combination of suitable clauses, wherein generating the emission criteria management strategy includes generating and applying an emission criteria management strategy that provides management and control of emissions from the vehicle and/or powertrain.
12. The method for managing emissions produced by a vehicle and/or powertrain of clause 1, any other suitable clause, or any combination of suitable clauses, wherein generating the emission criteria management strategy includes generating and applying an emission criteria management strategy that meets power needs of the vehicle and/or powertrain while also aligning with the emission criteria and/or regulations of a geographic region where the vehicle and/or powertrain is operating.

13. The method for managing emissions produced by a vehicle and/or powertrain of clause 1, any other suitable clause, or any combination of suitable clauses, wherein generating the emission criteria management strategy includes generating and applying an emission criteria management strategy to achieve regulatory readiness or compliance before the vehicle and/or powertrain approaches or enters a restricted or regulated geographic region.

14. The method for managing emissions produced by a vehicle and/or powertrain of clause 1, any other suitable clause, or any combination of suitable clauses, wherein generating the emission criteria management strategy includes generating and applying an emission criteria management strategy as the vehicle and/or powertrain approaches, is in vicinity of, enters, idles, docks, parks, and/or exits a restricted region or geographic area.

15. The method for managing emissions produced by a vehicle and/or powertrain of clause 1, any other suitable clause, or any combination of suitable clauses, wherein the emission criteria management strategy is a geofencing strategy.

16. The method for managing emissions produced by a vehicle and/or powertrain of clause 15, any other suitable clause, or any combination of suitable clauses, wherein generating the emission criteria management strategy includes considering and implementing control mechanisms to ensure acceptable emissions and emittants limits and restrictions for operating the vehicle and/or powertrain within a given boundary/region are met.

17. The method for managing emissions produced by a vehicle and/or powertrain of clause 1, any other suitable clause, or any combination of suitable clauses, wherein the emissions are any compound or composition known to be hazardous to the environment.

18. The method for managing emissions produced by a vehicle and/or powertrain of clause 1, any other suitable clause, or any combination of suitable clauses, wherein the emissions are at least one of chemicals, compounds, and compositions, such as water, air, fuel, and/or hydrogen, and wherein the at least one of chemicals, compounds, and compositions in at least one form of a gas form, a vapor form, a liquid form, and a solid form.

19. The method for managing emissions produced by a vehicle and/or powertrain of clause 1, any other suitable clause, or any combination of suitable clauses, wherein the emissions are at least one of electromagnetic emissions, electrical emissions, and other types of electricity-based emissions and electromagnetism-based emissions, such as emissions that cause an electromagnetic interference (EMI).

20. The method for managing emissions produced by a vehicle and/or powertrain of clause 1, any other suitable clause, or any combination of suitable clauses, wherein the emissions are noise.

21. The method for managing emissions produced by a vehicle and/or powertrain of clause 1, any other suitable clause, or any combination of suitable clauses, wherein the emission criteria management strategy is generated and implemented before the vehicle and/or powertrain enters a zone or a restricted region.

22. The method for managing emissions produced by a vehicle and/or powertrain of clause 21, any other suitable clause, or any combination of suitable clauses, wherein the restricted region is any geographical area or region with specific emission regulations, limitations, and/or prohibitions.

23. The method for managing emissions produced by a vehicle and/or powertrain of clause 21, any other suitable clause, or any combination of suitable clauses, wherein the restricted region is at least one of a port emission control area, an underground facility, such as one of an underground tunnel and station, a gas or refueling station, a building, a bus depot, a mining region, a parking lot, a barn, a bridge, a tunnel, such as an above-ground tunnel, an aerial zoning, and a dam.

24. The method for managing emissions produced by a vehicle and/or powertrain of clause 1, any other suitable clause, or any combination of suitable clauses, wherein managing the emissions includes managing emission readiness or preparedness by aligning the emissions of the vehicle and/or powertrain with established or pending regulations in a restricted region via dumping, exhausting, tanking, dilution, and purging.

25. The method for managing emissions produced by a vehicle and/or powertrain of clause 1, any other suitable clause, or any combination of suitable clauses, wherein managing the emissions includes managing emission readiness or preparedness by determining at least one of an availability of power and an amount of power needed to compliantly enter, operate, function, and/or exit a restricted region.

26. The method for managing emissions produced by a vehicle and/or powertrain of clause 1, any other suitable clause, or any combination of suitable clauses, wherein the vehicle and/or powertrain comprises a marine vessel, a train, a bus, or a mining equipment.

27. The method for managing emissions produced by a vehicle and/or powertrain of clause 1, any other suitable clause, or any combination of suitable clauses, wherein the vehicle and/or powertrain is used on waterways, highways, off-highways or off-road, underground, or in high altitude regions.

28. The method for managing emissions produced by a vehicle and/or powertrain of clause 1, any other suitable clause, or any combination of suitable clauses, wherein the processor and the controller communicate with one another, with one or more power sources, and one or more emission control devices over a communication network.

29. The method for managing emissions produced by a vehicle and/or powertrain of clause 1, any other suitable clause, or any combination of suitable clauses, wherein at least one of the processor and the controller is configured to access information about performance and emissions of each power source present in the vehicle and/or powertrain.

30. The method for managing emissions produced by a vehicle and/or powertrain of clause 1, any other suitable clause, or any combination of suitable clauses, wherein the controller is configured to control or manage emissions of the vehicle and/or powertrain by controlling operational functionality and/or performance of the one or more power sources and other equipment and/or parts of the vehicle and/or powertrain.

31. The method for managing emissions produced by a vehicle and/or powertrain of clause 1, any other suitable clause, or any combination of suitable clauses, wherein the one or more emission control devices are at least one of valves, pipes, lines, wires, modems, conduits, manifolds, actuators, sensors, water storage tanks, hydrogen storage tanks, air storage tanks, fuel storage tanks, batteries, air supply, motors, generators, and drive trains.

32. The method for managing emissions produced by a vehicle and/or powertrain of clause 1, any other suitable clause, or any combination of suitable clauses, wherein controlling the power output of the one or more power sources includes at least one of altering, decreasing, increasing, negating, or enhancing a function or performance of the one or more power sources.

33. The method for managing emissions produced by a vehicle and/or powertrain of clause 1, any other suitable clause, or any combination of suitable clauses, wherein the controller applying or implementing the emission criteria management strategy is present on the vehicle and/or powertrain.

34. The method for managing emissions produced by a vehicle and/or powertrain of clause 1, any other suitable clause, or any combination of suitable clauses, wherein the controller applying or implementing the emission criteria management strategy is not present on the vehicle and/or powertrain.

35. The method for managing emissions produced by a vehicle and/or powertrain of clause 1, any other suitable clause, or any combination of suitable clauses, wherein managing the emissions from the one or more emission control devices includes at least one of maintaining, reducing, storing, exhausting, removing, purging, and/or controlling emissions, and emittants, particularly hydrogen emissions to a level that is at or below 4% by volume.

36. The method for managing emissions produced by a vehicle and/or powertrain of clause 1, any other suitable clause, or any combination of suitable clauses, wherein managing the emissions from the one or more emission control devices includes venting hydrogen from the vehicle and/or powertrain in order to prevent hydrogen accumulation above 4% by volume.

37. The method for managing emissions produced by a vehicle and/or powertrain of clause 1, any other suitable clause, or any combination of suitable clauses, wherein managing the emissions from the one or more emission control devices includes at least one of venting, maintaining, reducing, storing, exhausting, removing, purging, and/or controlling the hydrogen of the vehicle and/or powertrain to prevent hydrogen accumulation above 4% by volume.

38. The method for managing emissions produced by a vehicle and/or powertrain of clause 1, any other suitable clause, or any combination of suitable clauses, wherein managing the emissions from the one or more emission control devices includes maintaining a hydrogen accumulation of the vehicle and/or powertrain to a level that ranges from about 0.1% to about 4% by volume, including any specific percentage comprised therein.

39. The method for managing emissions produced by a vehicle and/or powertrain of clause 1, any other suitable clause, or any combination of suitable clauses, wherein managing the emissions from the one or more emission control devices includes maintaining a hydrogen accumulation of the vehicle and/or powertrain at a level that ranges from about 0.5% to about 3.5%, about 1% to about 3.5%, about 1% to about 3.9%, about 1.5% to about 3.5%, about 2% to about 3%, about 2% to about 4%, about 2.5% to about 3.9%, about 2% to about 3%, about 3% to about 4%, and about 3% to about 3.9% by volume.

40. The method for managing emissions produced by a vehicle and/or powertrain of clause 1, any other suitable clause, or any combination of suitable clauses, wherein implementing the emission criteria management strategy further comprises diluting the hydrogen in the emissions exhaust, moving a portion of the emissions exhaust into an internal tank, purging the hydrogen from the vehicle and/or powertrain, or decreasing the hydrogen content in the emissions exhaust by changing the one or more power sources used in the vehicle and/or powertrain.

41. The method for managing emissions produced by a vehicle and/or powertrain of clause 1, any other suitable clause, or any combination of suitable clauses, wherein implementing the emission criteria management strategy includes operating one or more components known to aid in air flow and/or ventilation.

42. The method for managing emissions produced by a vehicle and/or powertrain of clause 41, any other suitable clause, or any combination of suitable clauses, wherein at least one of the one or more components is a fan, a blower, an exhaust, and an exhaust system.

43. The method for managing emissions produced by a vehicle and/or powertrain of clause 1, any other suitable clause, or any combination of suitable clauses, wherein generating the emission criteria management strategy includes identifying a primary power source selected from the one or more power sources of the vehicle and/or powertrain, wherein the primary power source is used in or in a vicinity of a restricted region.

44. The method for managing emissions produced by a vehicle and/or powertrain of clause 43, any other suitable clause, or any combination of suitable clauses, wherein the primary power source is one of a single power source or a combination of more than one power source.

45. The method for managing emissions produced by a vehicle and/or powertrain of clause 43, any other suitable clause, or any combination of suitable clauses, wherein the primary power source is a prime mover.

46. The method for managing emissions produced by a vehicle and/or powertrain of clause 45, any other suitable clause, or any combination of suitable clauses, wherein the primary power source is a hydrogen powered prime mover.

47. The method for managing emissions produced by a vehicle and/or powertrain of clause 43, any other suitable clause, or any combination of suitable clauses, wherein the primary power source comprises multiple movers, such as a prime mover and a secondary mover.

48. The method for managing emissions produced by a vehicle and/or powertrain of clause 43, any other suitable clause, or any combination of suitable clauses, wherein the power sources in the vehicle and/or powertrain include an engine and a fuel cell or fuel cell stack, and wherein the fuel cell or fuel cell stack is the primary power source in the restricted region.

49. The method for managing emissions produced by a vehicle and/or powertrain of clause 43, any other suitable clause, or any combination of suitable clauses, wherein the power sources in the vehicle and/or powertrain include an engine, a fuel cell or fuel cell stack, and a battery, and wherein the battery is the primary power source in the restricted region.

50. The method for managing emissions produced by a vehicle and/or powertrain of clause 43, any other suitable clause, or any combination of suitable clauses, wherein the power sources in the vehicle and/or powertrain include an engine, a fuel cell or fuel cell stack, and a battery, and wherein a combination of the fuel cell or fuel cell stack and the battery is the primary power source in the restricted region.

51. The method for managing emissions produced by a vehicle and/or powertrain of clause 1, any other suitable clause, or any combination of suitable clauses, wherein generating the emission criteria management strategy includes identifying the zone or the restricted region and identifying a primary power source to generate power output in the zone or the restricted region.

52. A method for controlling emissions produced by a vehicle and/or powertrain, the method comprising receiving one or more inputs into a processor in the vehicle and/or powertrain, generating an emission criteria management strategy by the processor that communicates with one or more power sources and a controller, identifying at least one primary power source selected from the one or more power sources, wherein the one or more power sources are selected from a fuel cell, a fuel cell stack, a battery, and combinations thereof, implementing the emission criteria management strategy by the controller that communicates with the one or more power sources and one or more emission control devices, engaging the at least one primary power source to produce a power output required by the vehicle and/or powertrain, controlling the power output of the one or more power sources and the emissions exhaust from the one or more emission control devices.

53. The method for controlling emissions produced by a vehicle and/or powertrain of clause 52, any other suitable clause, or any combination of suitable clauses, wherein generating the emission criteria management strategy includes generating and applying an emission criteria management strategy that provides management and control of emissions from the vehicle and/or powertrain.

54. The method for controlling emissions produced by a vehicle and/or powertrain of clause 52, any other suitable clause, or any combination of suitable clauses, wherein generating the emission criteria management strategy includes generating and applying an emission criteria management strategy that meets power needs of the vehicle and/or powertrain while also aligning with the emission criteria and/or regulations of a geographic region where the vehicle and/or powertrain is operating.

55. The method for controlling emissions produced by a vehicle and/or powertrain of clause 52, any other suitable clause, or any combination of suitable clauses, wherein generating the emission criteria management strategy includes generating and applying an emission criteria management strategy to achieve regulatory readiness or compliance before the vehicle and/or powertrain approaches or enters a restricted or regulated geographic region.

56. The method for controlling emissions produced by a vehicle and/or powertrain of clause 52, any other suitable clause, or any combination of suitable clauses, wherein generating the emission criteria management strategy includes generating and applying an emission criteria management strategy as the vehicle and/or powertrain approaches, is in vicinity of, enters, idles, docks, parks, and/or exits a restricted region or geographic area.

57. The method for controlling emissions produced by a vehicle and/or powertrain of clause 52, any other suitable clause, or any combination of suitable clauses, wherein the emission criteria management strategy is a geofencing strategy.

58. The method for controlling emissions produced by a vehicle and/or powertrain of clause 57, any other suitable clause, or any combination of suitable clauses, wherein generating the emission criteria management strategy includes considering and implementing control mechanisms to ensure acceptable emissions and emittants limits and restrictions for operating the vehicle and/or powertrain within a given boundary/region are met.

59. The method for controlling emissions produced by a vehicle and/or powertrain of clause 52, any other suitable clause, or any combination of suitable clauses, wherein the emissions are any compound or composition known to be hazardous to the environment.

60. The method for controlling emissions produced by a vehicle and/or powertrain of clause 52, any other suitable clause, or any combination of suitable clauses, wherein the emissions are at least one of chemicals, compounds, and compositions, such as water, air, fuel, and/or hydrogen, and wherein the at least one of chemicals, compounds, and compositions in at least one form of a gas form, a vapor form, a liquid form, and a solid form.

61. The method for controlling emissions produced by a vehicle and/or powertrain of clause 52, any other suitable clause, or any combination of suitable clauses, wherein the emissions are at least one of electromagnetic emissions, electrical emissions, and other types of electricity-based emissions and electromagnetism-based emissions, such as emissions that cause an electromagnetic interference (EMI).

62. The method for controlling emissions produced by a vehicle and/or powertrain of clause 52, any other suitable clause, or any combination of suitable clauses, wherein the emissions are noise.

63. The method for controlling emissions produced by a vehicle and/or powertrain of clause 52, any other suitable clause, or any combination of suitable clauses, wherein the emission criteria management strategy is generated and implemented before the vehicle and/or powertrain enters a zone or a restricted region.

64. The method for controlling emissions produced by a vehicle and/or powertrain of clause 63, any other suitable clause, or any combination of suitable clauses, wherein the restricted region is any geographical area or region with specific emission regulations, limitations, and/or prohibitions.

65. The method for controlling emissions produced by a vehicle and/or powertrain of clause 63, any other suitable clause, or any combination of suitable clauses, wherein the restricted region is at least one of a port emission control area, an underground facility, such as one of an underground tunnel and station, a gas or refueling station, a building, a bus depot, a mining region, a parking lot, a barn, a bridge, a tunnel, such as an above-ground tunnel, an aerial zoning, and a dam.

66. The method for controlling emissions produced by a vehicle and/or powertrain of clause 52, any other suitable clause, or any combination of suitable clauses, wherein managing the emissions includes managing emission readiness or preparedness by aligning the emissions of the vehicle and/or powertrain with established or pending regulations in a restricted region via dumping, exhausting, tanking, dilution, and purging.

67. The method for controlling emissions produced by a vehicle and/or powertrain of clause 52, any other suitable clause, or any combination of suitable clauses, wherein managing the emissions includes managing emission readiness or preparedness by determining at least one of an availability of power and an amount of power needed to compliantly enter, operate, function, and/or exit a restricted region.

68. The method for controlling emissions produced by a vehicle and/or powertrain of clause 52, any other suitable clause, or any combination of suitable clauses, wherein the vehicle and/or powertrain comprises a marine vessel, a train, a bus, or a mining equipment.

69. The method for controlling emissions produced by a vehicle and/or powertrain of clause 52, any other suitable clause, or any combination of suitable clauses, wherein the vehicle and/or powertrain is used on waterways, highways, off-highways or off-road, underground, or in high altitude regions.

70. The method for controlling emissions produced by a vehicle and/or powertrain of clause 52, any other suitable clause, or any combination of suitable clauses, wherein the processor and the controller communicate with one another, with one or more power sources, and one or more emission control devices over a communication network.

71. The method for controlling emissions produced by a vehicle and/or powertrain of clause 52, any other suitable clause, or any combination of suitable clauses, wherein at least one of the processor and the controller is configured to access information about performance and emissions of each power source present in the vehicle and/or powertrain.

72. The method for controlling emissions produced by a vehicle and/or powertrain of clause 52, any other suitable clause, or any combination of suitable clauses, wherein the controller is configured to control or manage emissions of the vehicle and/or powertrain by controlling operational functionality and/or performance of the one or more power sources and other equipment and/or parts of the vehicle and/or powertrain.

73. The method for controlling emissions produced by a vehicle and/or powertrain of clause 52, any other suitable clause, or any combination of suitable clauses, wherein the one or more emission control devices are at least one of valves, pipes, lines, wires, modems, conduits, manifolds, actuators, sensors, water storage tanks, hydrogen storage tanks, air storage tanks, fuel storage tanks, batteries, air supply, motors, generators, and drive trains.

74. The method for controlling emissions produced by a vehicle and/or powertrain of clause 52, any other suitable clause, or any combination of suitable clauses, wherein controlling the power output of the one or more power sources includes at least one of altering, decreasing, increasing, negating, or enhancing a function or performance of the one or more power sources.

75. The method for controlling emissions produced by a vehicle and/or powertrain of clause 52, any other suitable clause, or any combination of suitable clauses, wherein the controller applying or implementing the emission criteria management strategy is present on the vehicle and/or powertrain.

76. The method for controlling emissions produced by a vehicle and/or powertrain of clause 52, any other suitable clause, or any combination of suitable clauses, wherein the controller applying or implementing the emission criteria management strategy is not present on the vehicle and/or powertrain.

77. The method for controlling emissions produced by a vehicle and/or powertrain of clause 52, any other suitable clause, or any combination of suitable clauses, wherein managing the emissions from the one or more emission control devices includes at least one of maintaining, reducing, storing, exhausting, removing, purging, and/or controlling emissions, and emittants, particularly hydrogen emissions to a level that is at or below 4% by volume.

78. The method for controlling emissions produced by a vehicle and/or powertrain of clause 52, any other suitable clause, or any combination of suitable clauses, wherein managing the emissions from the one or more emission control devices includes venting hydrogen from the vehicle and/or powertrain in order to prevent hydrogen accumulation above 4% by volume.

79. The method for controlling emissions produced by a vehicle and/or powertrain of clause 52, any other suitable clause, or any combination of suitable clauses, wherein managing the emissions from the one or more emission control devices includes at least one of venting, maintaining, reducing, storing, exhausting, removing, purging, and/or controlling the hydrogen of the vehicle and/or powertrain to prevent hydrogen accumulation above 4% by volume.

80. The method for controlling emissions produced by a vehicle and/or powertrain of clause 52, any other suitable clause, or any combination of suitable clauses, wherein managing the emissions from the one or more emission control devices includes maintaining a hydrogen accumulation of the vehicle and/or powertrain to a level that ranges from about 0.1% to about 4% by volume, including any specific percentage comprised therein.

81. The method for controlling emissions produced by a vehicle and/or powertrain of clause 52, any other suitable clause, or any combination of suitable clauses, wherein managing the emissions from the one or more emission control devices includes maintaining a hydrogen accumulation of the vehicle and/or powertrain at a level that ranges from about 0.5% to about 3.5%, about 1% to about 3.5%, about 1% to about 3.9%, about 1.5% to about 3.5%, about 2% to about 3%, about 2% to about 4%, about 2.5% to about 3.9%, about 2% to about 3%, about 3% to about 4%, and about 3% to about 3.9% by volume.

82. The method for controlling emissions produced by a vehicle and/or powertrain of clause 52, any other suitable clause, or any combination of suitable clauses, wherein implementing the emission criteria management strategy further comprises diluting the hydrogen in the emissions exhaust, moving a portion of the emissions exhaust into an internal tank, purging the hydrogen from the vehicle and/or powertrain, or decreasing the hydrogen content in the emissions exhaust by changing the one or more power sources used in the vehicle and/or powertrain.

83. The method for controlling emissions produced by a vehicle and/or powertrain of clause 52, any other suitable clause, or any combination of suitable clauses, wherein implementing the emission criteria management strategy includes operating one or more components known to aid in air flow and/or ventilation.

84. The method for controlling emissions produced by a vehicle and/or powertrain of clause 83, any other suitable clause, or any combination of suitable clauses, wherein at least one of the one or more components is a fan, a blower, an exhaust, and an exhaust system.

85. The method for controlling emissions produced by a vehicle and/or powertrain of clause 52, any other suitable clause, or any combination of suitable clauses, wherein generating the emission criteria management strategy includes identifying a primary power source selected from the one or more power sources of the vehicle and/or powertrain, wherein the primary power source is used in or in a vicinity of a restricted region.

86. The method for controlling emissions produced by a vehicle and/or powertrain of clause 85, any other suitable clause, or any combination of suitable clauses, wherein the primary power source is one of a single power source or a combination of more than one power source.

87. The method for controlling emissions produced by a vehicle and/or powertrain of clause 85, any other suitable clause, or any combination of suitable clauses, wherein the primary power source is a prime mover.

88. The method for controlling emissions produced by a vehicle and/or powertrain of clause 85, any other suitable clause, or any combination of suitable clauses, wherein the primary power source is a hydrogen powered prime mover.

89. The method for controlling emissions produced by a vehicle and/or powertrain of clause 83, any other suitable clause, or any combination of suitable clauses, wherein the primary power source comprises multiple movers, such as a prime mover and a secondary mover.

90. The method for controlling emissions produced by a vehicle and/or powertrain of clause 83, any other suitable clause, or any combination of suitable clauses, wherein the power sources in the vehicle and/or powertrain include an engine and a fuel cell or fuel cell stack, and wherein the fuel cell or fuel cell stack is the primary power source in the restricted region.

91. The method for controlling emissions produced by a vehicle and/or powertrain of clause 83, any other suitable clause, or any combination of suitable clauses, wherein the power sources in the vehicle and/or powertrain include an engine, a fuel cell or fuel cell stack, and a battery, and wherein the battery is the primary power source in the restricted region.

92. The method for controlling emissions produced by a vehicle and/or powertrain of clause 83, any other suitable clause, or any combination of suitable clauses, wherein the power sources in the vehicle and/or powertrain include an engine, a fuel cell or fuel cell stack, and a battery, and wherein a combination of the fuel cell or fuel cell stack and the battery is the primary power source in the restricted region.

93. The method for controlling emissions produced by a vehicle and/or powertrain of clause 52, any other suitable clause, or any combination of suitable clauses, wherein generating the emission criteria management strategy includes identifying the zone or the restricted region and identifying a primary power source to generate power output in the zone or the restricted region.

94. The method for controlling emissions produced by a vehicle and/or powertrain of clause 52, any other suitable clause, or any combination of suitable clauses, wherein implementing the emission criteria management strategy further comprises diluting the hydrogen in the emissions exhaust, moving a part of the emissions exhaust into an internal tank, purging the hydrogen from the vehicle and/or powertrain, or decreasing the hydrogen content in the emissions exhaust by changing the one or more power source used in the vehicle and/or powertrain.

95. The method for controlling emissions produced by a vehicle and/or powertrain of clause 94, any other suitable clause, or any combination of suitable clauses, wherein generating the emission criteria management strategy further comprises identifying the zone or the restricted region and identifying a primary power source to generate power output in the zone or the restricted region.

96. A system for managing emissions produced by a vehicle and/or powertrain, comprising one or more power sources, a processor that generates an emission criteria management strategy based on one or more inputs and the one or more power sources, wherein the one or more power sources are selected from a fuel cell, a fuel cell stack, a battery, and combinations thereof, and a controller that implements the emission criteria management strategy in one or more power sources and one or more emission control devices in the vehicle and/or powertrain.

97. The system for managing emissions produced by a vehicle and/or powertrain of clause 96, any other suitable clause, or any combination of suitable clauses, wherein generating the emission criteria management strategy includes generating and applying an emission criteria management strategy that provides management and control of emissions from the vehicle and/or powertrain.

98. The system for managing emissions produced by a vehicle and/or powertrain of clause 96, any other suitable clause, or any combination of suitable clauses, wherein generating the emission criteria management strategy includes generating and applying an emission criteria management strategy that meets power needs of the vehicle and/or powertrain while also aligning with the emission criteria and/or regulations of a geographic region where the vehicle and/or powertrain is operating.

99. The system for managing emissions produced by a vehicle and/or powertrain of clause 98, any other suitable clause, or any combination of suitable clauses, wherein generating the emission criteria management strategy includes generating and applying an emission criteria management strategy to achieve regulatory readiness or compliance before the vehicle and/or powertrain approaches or enters a restricted or regulated geographic region.

100. The system for managing emissions produced by a vehicle and/or powertrain of clause 96, any other suitable clause, or any combination of suitable clauses, wherein generating the emission criteria management strategy includes generating and applying an emission criteria management strategy as the vehicle and/or powertrain approaches, is in vicinity of, enters, idles, docks, parks, and/or exits a restricted region or geographic area.

101. The system for managing emissions produced by a vehicle and/or powertrain of clause 96, any other suitable clause, or any combination of suitable clauses, wherein the emission criteria management strategy is a geofencing strategy.

102. The system for managing emissions produced by a vehicle and/or powertrain of clause 57, any other suitable clause, or any combination of suitable clauses, wherein generating the emission criteria management strategy includes considering and implementing control mechanisms to ensure acceptable emissions and emittants limits and restrictions for operating the vehicle and/or powertrain within a given boundary/region are met.

103. The system for managing emissions produced by a vehicle and/or powertrain of clause 96, any other suitable clause, or any combination of suitable clauses, wherein the emissions are any compound or composition known to be hazardous to the environment.

104. The system for managing emissions produced by a vehicle and/or powertrain of clause 96, any other suitable clause, or any combination of suitable clauses, wherein the emissions are at least one of chemicals, compounds, and compositions, such as water, air, fuel, and/or hydrogen, and wherein the at least one of chemicals, compounds, and compositions in at least one form of a gas form, a vapor form, a liquid form, and a solid form.

105. The system for managing emissions produced by a vehicle and/or powertrain of clause 96, any other suitable clause, or any combination of suitable clauses, wherein the emissions are at least one of electromagnetic emissions, electrical emissions, and other types of electricity-based emissions and electromagnetism-based emissions, such as emissions that cause an electromagnetic interference (EMI).

106. The system for managing emissions produced by a vehicle and/or powertrain of clause 96, any other suitable clause, or any combination of suitable clauses, wherein the emissions are noise.

107. The system for managing emissions produced by a vehicle and/or powertrain of clause 96, any other suitable clause, or any combination of suitable clauses, wherein the emission criteria management strategy is generated and implemented before the vehicle and/or powertrain enters a zone or a restricted region.

108. The system for managing emissions produced by a vehicle and/or powertrain of clause 96, any other suitable clause, or any combination of suitable clauses, wherein the restricted region is any geographical area or region with specific emission regulations, limitations, and/or prohibitions.

109. The system for managing emissions produced by a vehicle and/or powertrain of clause 96, any other suitable clause, or any combination of suitable clauses, wherein the restricted region is at least one of a port emission control area, an underground facility, such as one of an underground tunnel and station, a gas or refueling station, a building, a bus depot, a mining region, a parking lot, a barn, a bridge, a tunnel, such as an above-ground tunnel, an aerial zoning, and a dam.

110. The system for managing emissions produced by a vehicle and/or powertrain of clause 96, any other suitable clause, or any combination of suitable clauses, wherein managing the emissions includes managing emission readiness or preparedness by aligning the emissions of the vehicle and/or powertrain with established or pending regulations in a restricted region via dumping, exhausting, tanking, dilution, and purging.

111. The system for managing emissions produced by a vehicle and/or powertrain of clause 96, any other suitable clause, or any combination of suitable clauses, wherein managing the emissions includes managing emission readiness or preparedness by determining at least one of an availability of power and an amount of power needed to compliantly enter, operate, function, and/or exit a restricted region.

112. The system for managing emissions produced by a vehicle and/or powertrain of clause 96, any other suitable clause, or any combination of suitable clauses, wherein the vehicle and/or powertrain comprises a marine vessel, a train, a bus, or a mining equipment.

113. The system for managing emissions produced by a vehicle and/or powertrain of clause 96, any other suitable clause, or any combination of suitable clauses, wherein the vehicle and/or powertrain is used on waterways, highways, off-highways or off-road, underground, or in high altitude regions.

114. The system for managing emissions produced by a vehicle and/or powertrain of clause 96, any other suitable clause, or any combination of suitable clauses, wherein the processor and the controller communicate with one another, with one or more power sources, and one or more emission control devices over a communication network.

115. The system for managing emissions produced by a vehicle and/or powertrain of clause 96, any other suitable clause, or any combination of suitable clauses, wherein at least one of the processor and the controller is configured to access information about performance and emissions of each power source present in the vehicle and/or powertrain.

116. The system for managing emissions produced by a vehicle and/or powertrain of clause 96, any other suitable clause, or any combination of suitable clauses, wherein the controller is configured to control or manage emissions of the vehicle and/or powertrain by controlling operational functionality and/or performance of the one or more power sources and other equipment and/or parts of the vehicle and/or powertrain.

117. The system for managing emissions produced by a vehicle and/or powertrain of clause 96, any other suitable clause, or any combination of suitable clauses, wherein the one or more emission control devices are at least one of valves, pipes, lines, wires, modems, conduits, manifolds, actuators, sensors, water storage tanks, hydrogen storage tanks, air storage tanks, fuel storage tanks, batteries, air supply, motors, generators, and drive trains.

118. The system for managing emissions produced by a vehicle and/or powertrain of clause 96, any other suitable clause, or any combination of suitable clauses, wherein controlling the power output of the one or more power sources includes at least one of altering, decreasing, increasing, negating, or enhancing a function or performance of the one or more power sources.

119. The system for managing emissions produced by a vehicle and/or powertrain of clause 96, any other suitable clause, or any combination of suitable clauses, wherein the controller applying or implementing the emission criteria management strategy is present on the vehicle and/or powertrain.

120. The system for managing emissions produced by a vehicle and/or powertrain of clause 96, any other suitable clause, or any combination of suitable clauses, wherein the controller applying or implementing the emission criteria management strategy is not present on the vehicle and/or powertrain.

121. The system for managing emissions produced by a vehicle and/or powertrain of clause 96, any other suitable clause, or any combination of suitable clauses, wherein managing the emissions from the one or more emission control devices includes at least one of maintaining, reducing, storing, exhausting, removing, purging, and/or controlling emissions, and emittants, particularly hydrogen emissions to a level that is at or below 4% by volume.

122. The system for managing emissions produced by a vehicle and/or powertrain of clause 96, any other suitable clause, or any combination of suitable clauses, wherein managing the emissions from the one or more emission control devices includes venting hydrogen from the vehicle and/or powertrain in order to prevent hydrogen accumulation above 4% by volume.

123. The system for managing emissions produced by a vehicle and/or powertrain of clause 96, any other suitable clause, or any combination of suitable clauses, wherein managing the emissions from the one or more emission control devices includes at least one of venting, maintaining, reducing, storing, exhausting, removing, purging, and/or controlling the hydrogen of the vehicle and/or powertrain to prevent hydrogen accumulation above 4% by volume.

124. The system for managing emissions produced by a vehicle and/or powertrain of clause 96, any other suitable clause, or any combination of suitable clauses, wherein managing the emissions from the one or more emission control devices includes maintaining a hydrogen accumulation of the vehicle and/or powertrain to a level that ranges from about 0.1% to about 4% by volume, including any specific percentage comprised therein.

125. The system for managing emissions produced by a vehicle and/or powertrain of clause 96, any other suitable clause, or any combination of suitable clauses, wherein managing the emissions from the one or more emission control devices includes maintaining a hydrogen accumulation of the vehicle and/or powertrain at a level that ranges from about 0.5% to about 3.5%, about 1% to about 3.5%, about 1% to about 3.9%, about 1.5% to about 3.5%, about 2% to about 3%, about 2% to about 4%, about 2.5% to about 3.9%, about 2% to about 3%, about 3% to about 4%, and about 3% to about 3.9% by volume.

126. The system for managing emissions produced by a vehicle and/or powertrain of clause 96, any other suitable clause, or any combination of suitable clauses, wherein implementing the emission criteria management strategy further comprises diluting the hydrogen in the emissions exhaust, moving a portion of the emissions exhaust into an internal tank, purging the hydrogen from the vehicle and/or powertrain, or decreasing the hydrogen content in the emissions exhaust by changing the one or more power sources used in the vehicle and/or powertrain.

127. The system for managing emissions produced by a vehicle and/or powertrain of clause 96, any other suitable clause, or any combination of suitable clauses, wherein implementing the emission criteria management strategy includes operating one or more components known to aid in air flow and/or ventilation.

128. The system for managing emissions produced by a vehicle and/or powertrain of clause 127, any other suitable clause, or any combination of suitable clauses, wherein at least one of the one or more components is a fan, a blower, an exhaust, and an exhaust system.

129. The system for managing emissions produced by a vehicle and/or powertrain of clause 96, any other suitable clause, or any combination of suitable clauses, wherein generating the emission criteria management strategy includes identifying a primary power source selected from the one or more power sources of the vehicle and/or powertrain, wherein the primary power source is used in or in a vicinity of a restricted region.

130. The system for managing emissions produced by a vehicle and/or powertrain of clause 129, any other suitable clause, or any combination of suitable clauses, wherein the primary power source is one of a single power source or a combination of more than one power source.

131. The system for managing emissions produced by a vehicle and/or powertrain of clause 129, any other suitable clause, or any combination of suitable clauses, wherein the primary power source is a prime mover.

132. The system for managing emissions produced by a vehicle and/or powertrain of clause 129, any other suitable clause, or any combination of suitable clauses, wherein the primary power source is a hydrogen powered prime mover.

133. The system for managing emissions produced by a vehicle and/or powertrain of clause 127, any other suitable clause, or any combination of suitable clauses, wherein the primary power source comprises multiple movers, such as a prime mover and a secondary mover.

134. The system for managing emissions produced by a vehicle and/or powertrain of clause 127, any other suitable clause, or any combination of suitable clauses, wherein the power sources in the vehicle and/or powertrain include an engine and a fuel cell or fuel cell stack, and wherein the fuel cell or fuel cell stack is the primary power source in the restricted region.

135. The system for managing emissions produced by a vehicle and/or powertrain of clause 127, any other suitable clause, or any combination of suitable clauses, wherein the power sources in the vehicle and/or powertrain include an engine, a fuel cell or fuel cell stack, and a battery, and wherein the battery is the primary power source in the restricted region.

136. The system for managing emissions produced by a vehicle and/or powertrain of clause 127, any other suitable clause, or any combination of suitable clauses, wherein the power sources in the vehicle and/or powertrain include an engine, a fuel cell or fuel cell stack, and a battery, and wherein a combination of the fuel cell or fuel cell stack and the battery is the primary power source in the restricted region.

137. The system for managing emissions produced by a vehicle and/or powertrain of clause 96, any other suitable clause, or any combination of suitable clauses, wherein the one or more power sources comprises at least one primary power source for the vehicle and/or powertrain.

138. The system for managing emissions produced by a vehicle and/or powertrain of clause 137, any other suitable clause, or any combination of suitable clauses, wherein the one or more emission control devices comprises at least one sensor for the vehicle and/or powertrain.

139. The system for managing emissions produced by a vehicle and/or powertrain of clause 96, any other suitable clause, or any combination of suitable clauses, wherein generating the emission criteria management strategy includes identifying the zone or the restricted region and identifying a primary power source to generate power output in the zone or the restricted region.

140. The system for managing emissions produced by a vehicle and/or powertrain of clause 96, any other suitable clause, or any combination of suitable clauses, wherein implementing the emission criteria management strategy further comprises diluting the hydrogen in the emissions exhaust, moving a part of the emissions exhaust into an internal tank, purging the hydrogen from the vehicle and/or powertrain, or decreasing the hydrogen content in the emissions exhaust by changing the one or more power source used in the vehicle and/or powertrain.

141. The system for managing emissions produced by a vehicle and/or powertrain of clause 96, any other suitable clause, or any combination of suitable clauses, wherein generating the emission criteria management strategy further comprises identifying the zone or the restricted region and identifying a primary power source to generate power output in the zone or the restricted region.

142. The system for managing emissions produced by a vehicle and/or powertrain of clause 96, any other suitable clause, or any combination of suitable clauses, wherein the system is employed when the vehicle and/or powertrain enters a zone or a restricted region.

143. The system for managing emissions produced by a vehicle and/or powertrain of clause 96, any other suitable clause, or any combination of suitable clauses, wherein the one or more emission control devices comprises at least one storage tank for the vehicle and/or powertrain.

144. The system for managing emissions produced by a vehicle and/or powertrain of clause 143, any other suitable clause, or any combination of suitable clauses, wherein generating the emission criteria management strategy further comprises identifying the zone or the restricted region and identifying a primary power source to generate power output in the zone or the restricted region.

145. The method for managing emissions produced by a vehicle and/or powertrain of clause 1, any other suitable clause, or any combination of suitable clauses, wherein the emission criteria management strategy is implemented before the vehicle and/or powertrain enters a first zone of the restricted region.

146. The method for managing emissions produced by a vehicle and/or powertrain of clause 145, any other suitable clause, or any combination of suitable clauses, wherein the emissions from the one or more emission control devices is managed while the vehicle and/or powertrain travels from the first zone to a second zone of the restricted region.

147. The method for managing emissions produced by a vehicle and/or powertrain of clause 1, any other suitable clause, or any combination of suitable clauses, wherein the one or more power sources are further selected from a diesel engine, an internal combustion engine, a hydrogen powered engine, or combinations thereof.

148. The method for managing emissions produced by a vehicle and/or powertrain of clause 1, any other suitable clause, or any combination of suitable clauses, wherein the emission criteria management strategy includes a first emission criteria management strategy and a second emission criteria management strategy.

149. The method for managing emissions produced by a vehicle and/or powertrain of clause 148, any other suitable clause, or any combination of suitable clauses, wherein the first emission criteria management strategy is communicated to a first primary power source and the second emission criteria management strategy is communicated to a second primary power source.

150. The method for managing emissions produced by a vehicle and/or powertrain of clause 149, any other suitable clause, or any combination of suitable clauses, wherein both the first and the second emission criteria management strategy are implemented by the controller to one or more emission control devices.

151. The method for managing emissions produced by a vehicle and/or powertrain of clause 150, any other suitable clause, or any combination of suitable clauses, wherein the first and the second primary power sources are selectively utilized.

152. The system for managing emissions produced by a vehicle and/or powertrain of clause 96, any other suitable clause, or any combination of suitable clauses, wherein the one or more power sources are further selected from a diesel engine, an internal combustion engine, a hydrogen powered engine, or combinations thereof.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word “a” or “an” should be understood as not excluding plural of said elements or steps, unless such exclusion is explicitly stated. Furthermore, references to “one embodiment” of the presently described subject matter are not intended to be interpreted as excluding the existence of additional embodiments that also incorporate the recited features. Specified numerical ranges of units, measurements, and/or values include, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third," and the like, as used herein do not denote any order or importance, but rather are used to distinguish one element from another. The term "or" and "and/or" is meant to be inclusive and mean either, all, or any combination of the listed items. In addition, the terms "connected" and "coupled" are not restricted to physical or mechanical connections or couplings, and can include electrical connections or couplings, whether direct or indirect. Direct connection and/or coupling can include such connections and/or couplings where no intermittent connection or component is present between two endpoints, components or items. Indirect connection and/or coupling can include where there is one or more intermittent or intervening connections and/or couplings present between respective endpoints, components or items.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The phrase "consisting of" or "consists of" refers to a compound, composition, formulation, or method that excludes the presence of any additional elements, components, or method steps.

The term "consisting of" also refers to a compound, composition, formulation, or method of the present disclosure that excludes the presence of any additional elements, components, or method steps. The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for managing hydrogen emissions produced by a vehicle, the method comprising:

controlling a first power source and a second power source different from the first power source so that the first power source provides a majority of a total power required by the vehicle, receiving one or more inputs into a processor of the vehicle, the one or more inputs including a vehicle location of the vehicle and a geofencing restriction, generating an emission criteria management strategy by the processor based on the one or more inputs, diluting the hydrogen emissions before the vehicle enters the geofencing restriction, determining a distance between the vehicle location of the vehicle and the geofencing restriction, and in response to the distance being equal to or less than a threshold, implementing the emission criteria management strategy by a controller that communicates with the first power source, the second power source, and one or more emission control devices, wherein implementing the emission criteria management strategy includes managing the hydrogen emissions from the one or more emission control devices.

2. The method of claim 1, wherein managing the hydrogen emissions from the one or more emission control devices includes moving a portion of the hydrogen emissions into an internal tank of the vehicle for storage before the vehicle enters the geofencing restriction.

3. The method of claim 1, wherein managing the hydrogen emissions from the one or more emission control devices includes purging the hydrogen emissions from the vehicle before the vehicle enters the geofencing restriction to prevent hydrogen accumulation above 4% by volume.

4. The method of claim 1, wherein the first power source is an engine and the second power source is a battery.

5. The method of claim 1, wherein the first power source is a fuel cell and the second power source is a battery.

6. The method of claim 1, wherein the threshold is greater than zero such that the emission criteria management strategy is implemented before the vehicle enters the geofencing restriction.

7. The method of claim 1, wherein managing the hydrogen emissions from the one or more emission control devices includes controlling the first power source and the second power source via the controller such that the second power source provides the majority of the total power required by the vehicle so that a production of hydrogen exhaust by the first power source is decreased.

8. The method of claim 1, further comprising receiving sensor inputs into the processor from one or more sensors on the vehicle related to an amount of hydrogen emissions from the one or more emission control devices.

9. The method of claim 1, further comprising charging the second power source in response to the distance being greater than the threshold.

10. The method of claim 1, wherein the vehicle comprises a marine vessel, a train, a bus, or a mining equipment.

11. The method of claim 1, wherein the vehicle is used on waterways, highways, off-highways, off-road, underground, or in high altitude regions.

12. A system for managing hydrogen emissions produced by a vehicle, the system comprising:

a first power source, a second power source different from the first power source, a processor that generates an emission criteria management strategy based, at least in part, on one or more inputs, wherein the one or more inputs includes a vehicle location of the vehicle and a geofencing restriction, and a controller configured to operate the first power source such that the first power source provides a majority of a total power required by the vehicle and configured to implement the emission criteria management strategy by managing the hydrogen emissions from one or more emission control devices in response to determining that a distance between the vehicle location of the vehicle and the geofencing restriction is equal to or less than a threshold, wherein the controller is configured to purge the hydrogen emissions from the vehicle through a ventilation system before the vehicle enters the geofencing restriction.

13. The system of claim 12, further comprising an internal tank, wherein a portion of the hydrogen emissions is moved into the internal tank for storage before the vehicle enters the geofencing restriction.

14. The system of claim 12, wherein the first power source is an engine and the second power source is a battery.

15. The system of claim 12, wherein the first power source is a fuel cell and the second power source is a battery.

16. The system of claim 12, wherein the threshold is greater than zero such that the emission criteria management strategy is implemented before the vehicle enters the geofencing restriction.

17. The system of claim 12, wherein the controller is configured to operate the first power source and the second power source such that the second power source provides the majority of the total power required by the vehicle in order to manage the hydrogen emissions from the one more emission control devices so that a production of hydrogen exhaust by the first power source is decreased.

18. The system of claim 12, further comprising one or more sensors configured to provide sensor inputs to the processor related to an amount of hydrogen emissions from the one or more emission control devices.

19. The system of claim 12, wherein the controller is configured to dilute the hydrogen emissions before the vehicle enters the geofencing restriction.

20. The system of claim 12, wherein the vehicle is used on waterways, highways, off-highways, off-road, underground, or in high altitude regions.

* * * * *